United States Patent
Ishii et al.

(10) Patent No.: US 7,450,319 B2
(45) Date of Patent: Nov. 11, 2008

(54) ZOOM LENS

(75) Inventors: Atsujiro Ishii, Shibuya-ku (JP);
Hirohiko Kimata, Shibuya-ku (JP)

(73) Assignee: Olympus Imaging Corp., Tokyo (JP)

(*) Notice: Subject to any disclaimer, the term of this patent is extended or adjusted under 35 U.S.C. 154(b) by 0 days.

(21) Appl. No.: 11/900,379

(22) Filed: Sep. 10, 2007

(65) Prior Publication Data

US 2008/0062534 A1  Mar. 13, 2008

(30) Foreign Application Priority Data

Sep. 12, 2006  (JP) ............................. 2006-246348

(51) Int. Cl.
*G02B 15/14* (2006.01)
*G02B 9/00* (2006.01)
*G02B 9/14* (2006.01)

(52) U.S. Cl. .................. 359/690; 359/689; 359/740; 359/785

(58) Field of Classification Search ................. 359/676, 359/683, 689, 690, 739, 740, 784–788
See application file for complete search history.

(56) References Cited

U.S. PATENT DOCUMENTS 7,336,429 B2* 2/2008 Shibayama ................. 359/690

FOREIGN PATENT DOCUMENTS

JP         62-009311         1/1987

* cited by examiner

*Primary Examiner*—William C. Choi
*Assistant Examiner*—Jack Dinh
(74) *Attorney, Agent, or Firm*—Kenyon & Kenyon LLP

(57) ABSTRACT

The invention relates to a zoom lens in which tweaks to the mode of movement of lens groups and the first lens group contribute more to making sure the desired zoom ratio and optical performances and ensuring that the whole length of the zoom lens is kept short while carrying it around. The zoom lens comprises a positive first lens group G1, a negative second lens group G2 and a positive third lens group G3, and includes an aperture stop S located between the second G2 and the third lens group G3. Upon zooming from the wide-angle end to the telephoto end, the first lens group G1 moves in unison, and the second lens group G2 moves in unison. The first G1 and the second lens group G2 are positioned nearer to the object side at the telephoto end than at the wide-angle end, with an increasing spacing between the first G1 and the second lens group G2 and a decreasing spacing between the second G2 and the third lens group G3. The zoom lens satisfies conditions (1) and (2) about the power and the amount of movement of the first lens group G1.

17 Claims, 16 Drawing Sheets

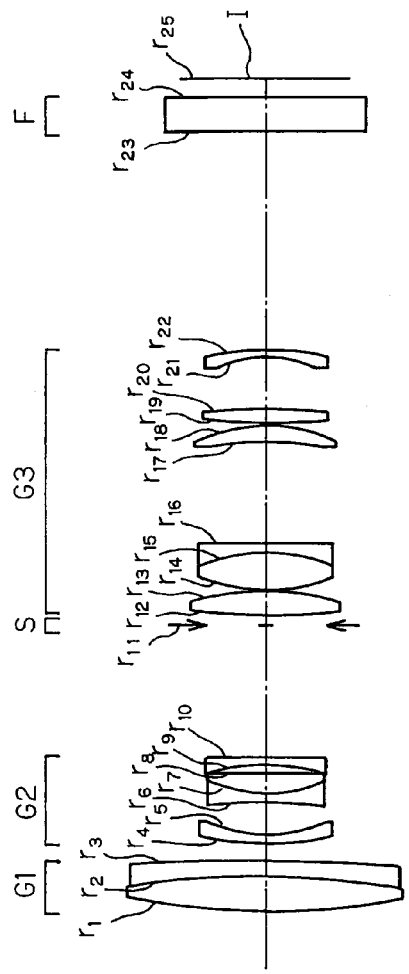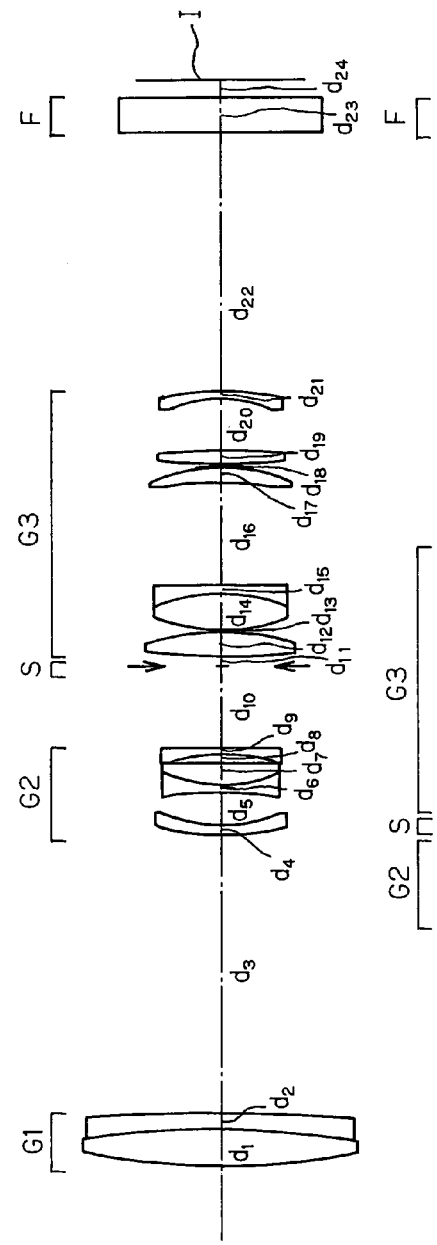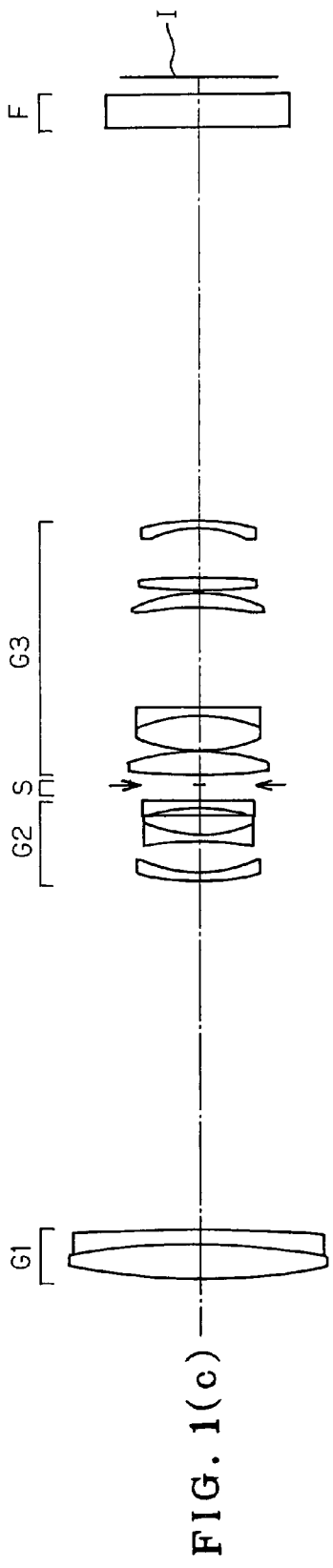
FIG. 1(a)
FIG. 1(b)
FIG. 1(c)

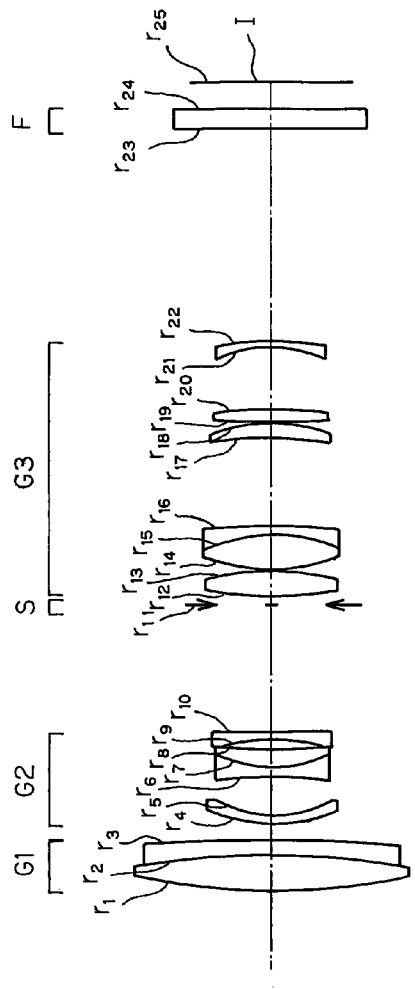
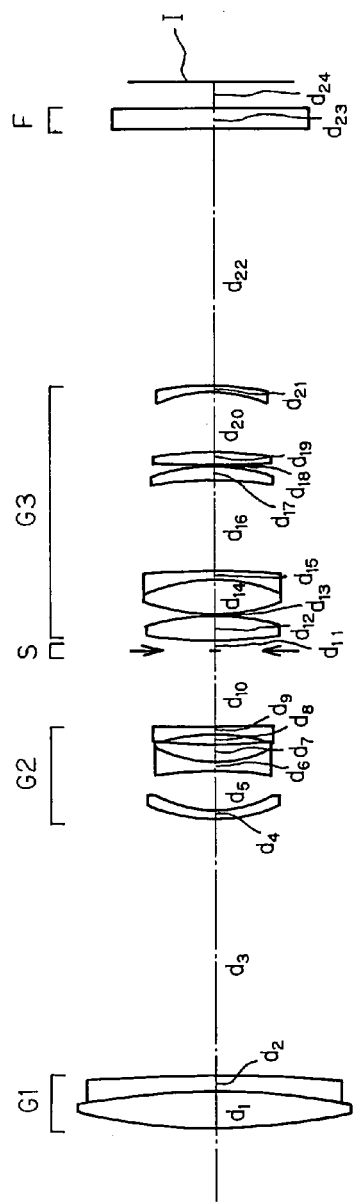
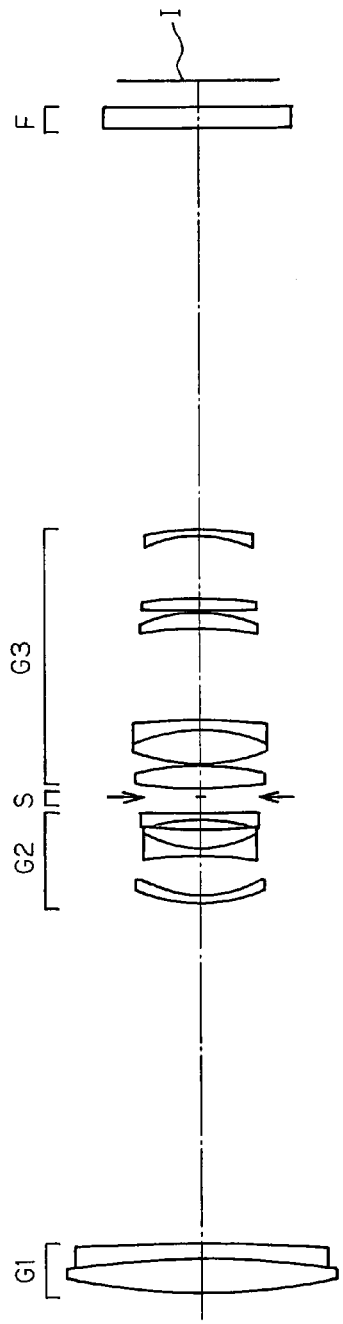
FIG. 2(a)
FIG. 2(b)
FIG. 2(c)

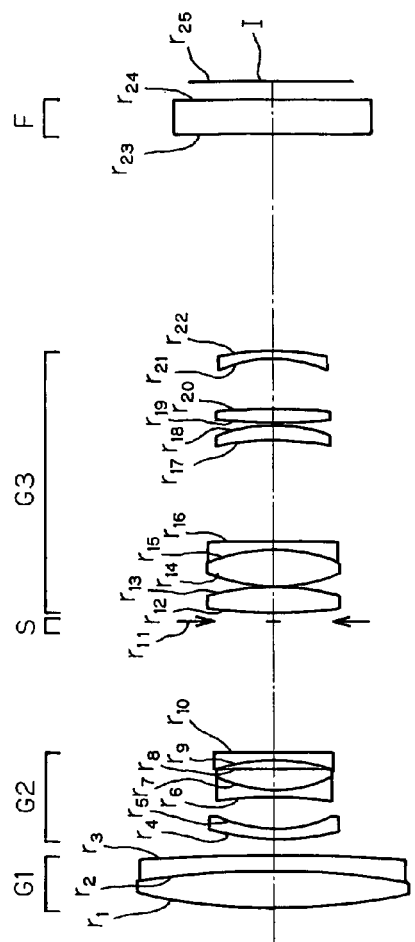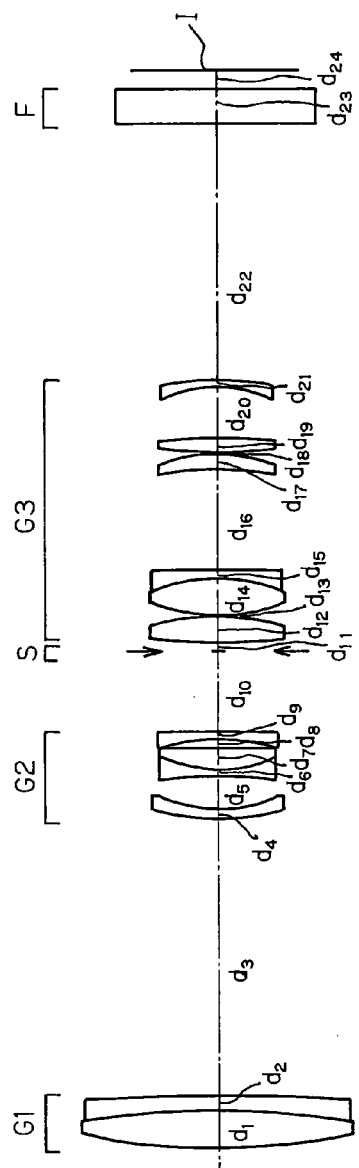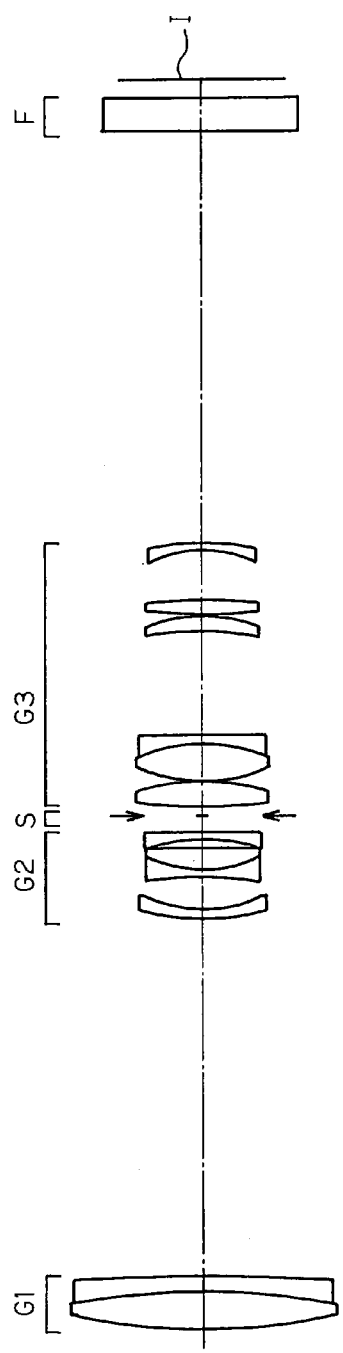
FIG. 3(a)
FIG. 3(b)
FIG. 3(c)

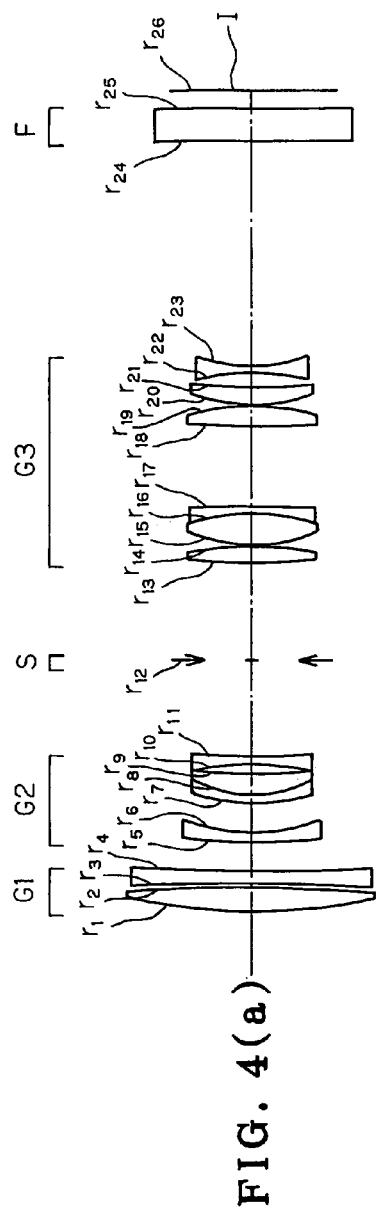
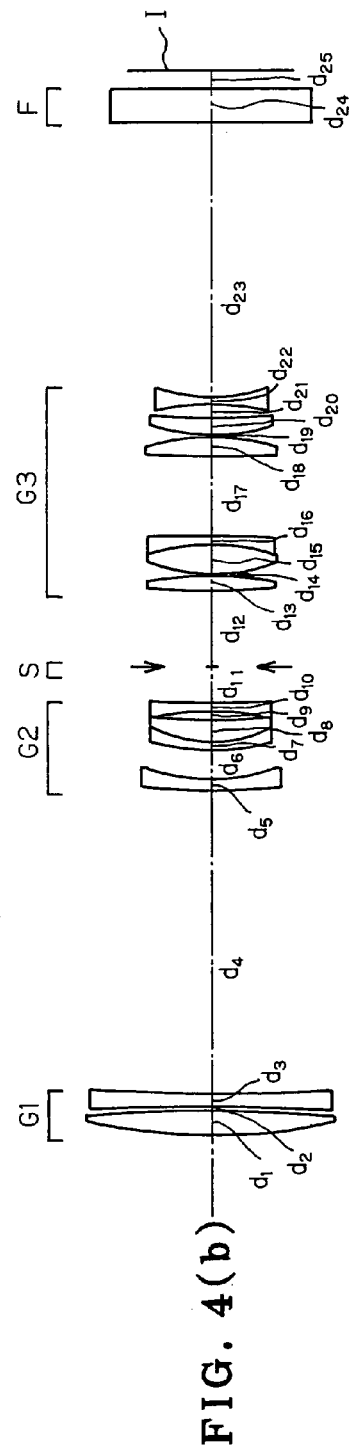
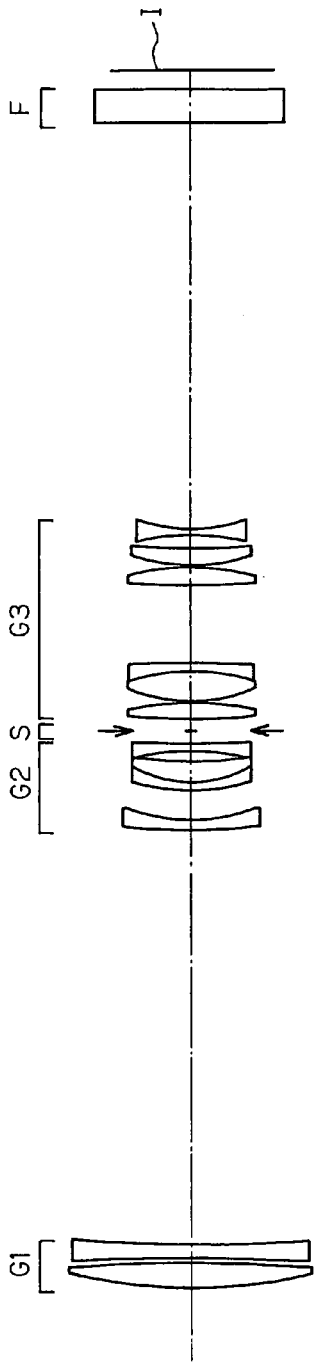
FIG. 4(a)
FIG. 4(b)
FIG. 4(c)

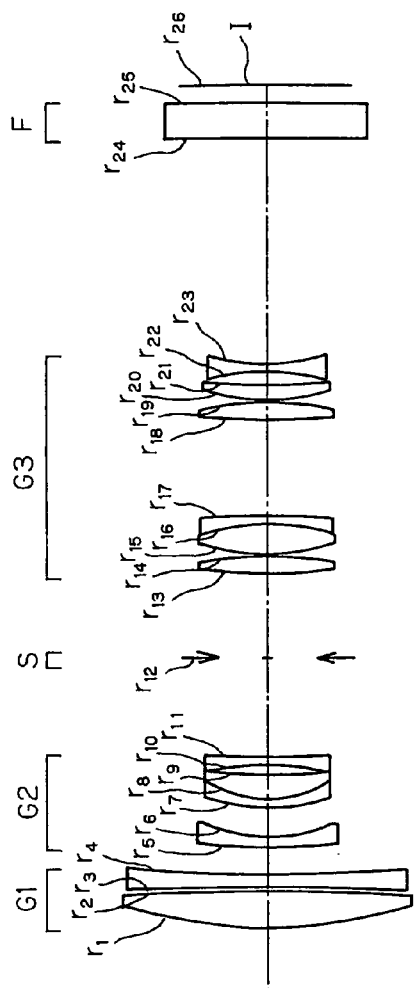
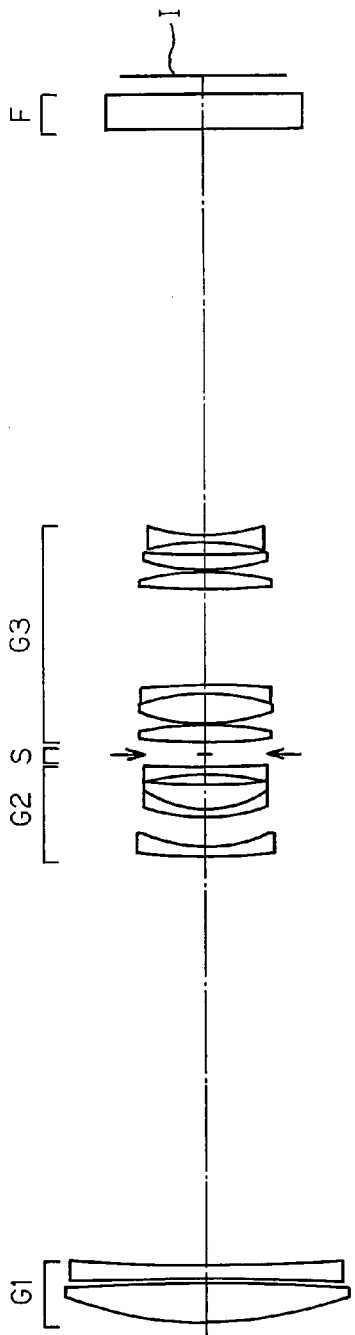
FIG. 5(a)
FIG. 5(b)
FIG. 5(c)

ZOOM LENS

This application claims benefit of Japanese Application No. 2006-246348 filed in Japan on Sep. 12, 2006, the contents of which are incorporated by this reference.

BACKGROUND OF THE INVENTION

The present invention relates generally to a zoom lens, and particularly to a zoom lens designed to cover a medium telephoto zone having a total angle of view of 25° to 35° at the wide-angle end and a zoom ratio of 3 to 5.

More particularly, the invention is concerned with a zoom lens that is suitable for use as an interchangeable lens for single-lens reflex cameras.

So far, the zoom lens set forth in Patent Publication 1 has been known as a zoom lens adapted to cover a medium telephoto zone and lend itself to interchangeable lenses for single-lens reflex cameras. That zoom lens is made up of, in order from its object side, a first lens group of positive refracting power, a second lens group of negative refracting power and a third lens group of positive refracting power, wherein zooming from the wide-angle end to the telephoto end is implemented by varying an axial spacing between the first and the second lens group and an axial spacing between the second; and the third lens group. And, the zoom lens operates in such a moving mode that the total length of the zoom lens becomes short at the wide-angle end.

Patent Publication 1

JP (A) 62-9311

However, problems with this zoom lens are that the second lens group is likely to interfere with the third lens group on the telephoto side; the refracting power of the first lens group is too strong to hold back aberration fluctuations due to changes in the spacing between the first and the second lens group; the first lens group is thick, etc. all working against size reductions and higher zoom ratios.

SUMMARY OF THE INVENTION

In view of such problems with the prior art, one object of the invention is to provide a zoom lens which works for making sure the desired zoom ratios and optical performances while its whole length is kept short on carrying by tweaks to the moving mode of lens groups and the first lens group.

Another object is to provide a zoom lens which works for any one of good optical performances, size reductions, higher zoom ratios, etc. by tweaks to the respective lens groups.

According to the present invention, the aforesaid objects are accomplishable by the provision of a zoom lens comprising, in order from an object side thereof, a first lens group having positive refracting power, a second lens group having negative refracting power and a third lens group having positive refracting power, wherein:

an aperture stop is located between said second lens group and said third lens group;

upon zooming from a wide-angle end to a telephoto end of the zoom lens, said first lens group moves in unison, said second lens group moves in unison, and said first lens group and said second lens group are positioned nearer to the object side at said wide-angle end than said telephoto end with an increasing spacing between said first lens group and said second lens group and a decreasing spacing between said second lens group and said third lens group; and the following conditions (1) and (2) are satisfied:

$$0.7 < f_1/f_t < 1.2 \quad (1)$$

$$0.3 < m_1/f_t < 0.45 \quad (2)$$

where $f_1$ is the focal length of the first lens group, $f_t$ is the focal length of the whole zoom lens system at the telephoto end, $m_1$ is a difference in the position of the first lens group between at the wide-angle end and at the telephoto end, provided that a plus sign is indicative of movement of the first lens group toward the object side.

The advantages of, and the requirements for, the invention are now explained.

By reducing the size of the zoom lens near the wide-angle end, it is possible to increase the ability of the associated camera to be carried around. With that in mind, the zoom lens is designed such that upon zooming from the wide-angle end to the telephoto end, the first lens group moves in unison, the second lens group moves in unison, and the first lens group and the second lens group are positioned nearer to the object side at the telephoto end than at the wide-angle end, with an increasing spacing between the first lens group and the second lens group and a decreasing spacing between the second lens group and the third lens group.

Thus, the whole zoom lens length is made short near the wide-angle end while easily making sure the desired zoom ratios.

Here, the location of the aperture stop between the second lens group and the third lens group is favorable for keeping aberrations well in balance because two lens groups having powers of different signs are going to be located on the object side with respect to the stop. This is also preferable because the diameters of the respective lens groups are easily brought well in balance and an exit pupil is easily spaced away from an image plane.

To position the second lens group nearer to the object side at the telephoto end than at the wide-angle end works for making sure the amount of movement of the third lens group and, hence, for making sure the desired zoom ratio while keeping the whole length of the zoom lens short near the telephoto end.

For the purpose of making sure the desired zoom ratio and keeping aberrations better in balance while adopting such a moving mode, it is preferable to appropriately adjust the power and the amount of movement of the first lens group.

For the first lens group, it is effective to make its power weak to a suitable degree. As the positive power of the first lens group becomes weak, it is favorable for keeping the first lens group thin, too, because the amount of aberrations occurring at the first lens group is kept small.

On the other hand, as the positive power of the first lens group becomes too weak, there is a considerable diminution in the zooming action from changes in the spacing between the first and the second lens group.

From such standpoints, the first lens group should satisfy conditions (1) and (2) in terms of the power and the amount of movement.

As the lower limit of 0.7 to condition (1) is not reached, it causes the focal length of the first lens group to become short (or its power to become strong), tending to give rise to aberrations. To hold back such aberrations, the axial thickness of the first lens group must be increased; however, it is difficult to shorten the whole length of the zoom lens near the wide-angle end.

On the other hand, as the upper limit of 1.2 to condition (1) is exceeded, it causes the focal length of the first lens group to grow long (or its power to become weak); there is an unavoidable diminution in the zooming action from changes in the spacing between the first and the second lens group.

Condition (2) should preferably be satisfied along with condition (1). As the lower limit of 0.3 is not reached, the amount of movement of the first lens group becomes small; however, this is not preferable for correction of aberrations, because when it is intended to shorten the total length of the zoom lens near the wide-angle end and make sure the desired zoom ratio, the negative power of the second lens group grows too strong.

As the upper limit of 0.45 to condition (2) is exceeded, the change in the total length of the zoom lens from the wide-angle end to the telephoto end tends to grow large. Even with the first lens group slimmed down, therefore, there would be a large change in the weight balance of the zoom lens in use, which would render it hard to operate.

It is more preferable to satisfy the following condition (1-1) where the upper limit to condition (1) is reduced down to 0.92.

$$0.7 < f_1/f_t < 0.92 \quad (1\text{-}1)$$

If this condition (1-1) is satisfied, it is then easier to hold back changes in the whole length of the zoom lens.

It is also more preferable to bring the lower limit to condition (1) or (1-1) up to 0.8, because aberrations occurring at the first lens group are much more reduced.

The lower limit to condition (2) may as well be set at 0.34.

The upper limit to condition (2) may as well be set at 0.40.

More preferably, the combined system of the first and the second lens system should have negative refracting power at the wide-angle end.

When the zoom lens of the invention is used with single-lens reflex cameras employing silver halide films or single-lens reflex cameras incorporating an electronic imaging device such as CCD or CMOS as an imaging device, it is required to make sure the necessary back focus and a space capable of receiving a quick return mirror, etc. When the zoom lens of the invention is used with a single-lens reflex camera incorporating an electronic imaging device, on the other hand, the spacing between a taking optical system and an imaging screen must be larger than imaging screen size, because of the need of allowing for a space for receiving an infrared cut filter or low-pass filter as well as a space for receiving a dustproof filter, etc.

It is therefore preferable that the aforesaid arrangement is set up in the form of a retrofocus type where there is negative power in front of the aperture stop and positive power in the rear of the aperture stop, because the back focus capable of receiving such optical elements can be ensured.

It is preferable that the first lens group is made up of two lenses, a negative lens and a positive lens, wherein the surface of that positive lens on the negative lens side is configured as a convex surface and the surface of that negative lens on the positive lens side is configured as a concave surface with satisfaction of the following conditions (3) and (4).

$$\Delta n_1 > 0.05 \quad (3)$$

$$\Delta v_1 > 20 \quad (4)$$

Here $\Delta n_1$ is the value of a difference obtained by subtracting the refractive index of the positive lens from the refractive index of the negative lens in the first lens group, and $\Delta v_1$ is the value of a difference obtained by subtracting the Abbe number of the negative lens from the Abbe number of the positive lens in the first lens group.

The aforesaid arrangement works for the downsizing and slimming-down of the first lens group, and satisfying the aforesaid conditions while making sure the refractive index difference and Abbe number differences between the respective lenses works for correction of chromatic aberrations.

More preferably, the first lens group is made up of a cemented lens composed of a positive and a negative lens in order from the object side with satisfaction of the following condition (5).

$$0.05 < \Delta n_1 < 0.25 \quad (5)$$

Here $\Delta n_1$ is the value of a difference obtained by subtracting the refractive index of the positive lens from the refractive index of the negative lens in the first lens group.

The first lens group is made up of a positive lens and a negative lens in order to correct it for chromatic aberrations. Further in order to correct positive distortion at the wide-angle end in particular, the positive lens and the negative lens should preferably be located in this order. As these lenses are cemented together into a cemented lens, it is favorable for supporting a lens barrel and reducing flare ghosts. And it is more preferable to satisfy condition (5).

Being not less than the lower limit of 0.05 to condition (5) at the very least is favorable for making sure the ability to correct distortion at the cementing surface of the positive and the negative lens, and being not greater than the upper limit of 0.25 to condition (5) at the very least makes it easy to ensure the refractive index of the positive lens and prepare a design with well-balanced spherical aberrations and coma.

The lower limit to condition (5) is changed to more preferably 0.1, and most preferably 0.2.

More preferably, the second lens group should satisfy the following condition (6) with respect to the moving mode.

$$0 < m_2/f_t < 0.1 \quad (6)$$

Here $m_2$ is a difference in the position of the second lens group between at the wide-angle end and at the telephoto end, provided that a plus sign is indicative of movement of the second lens group toward the object side.

Being not less than the lower limit of 0 to condition (6) at the very least is favorable for making sure the amount of movement of the second lens group while aberration fluctuation upon zooming are hold back and, hence, for ensuring the desired zoom ratio.

By being not greater than the upper limit of 0.1 to condition (6) at the very least, on the other hand, the amount of movement of the second lens group is moderately decreased with the result that there can be no or little change in the whole length of the zoom lens at the wide-angle end and the telephoto end and the lens barrel and the zoom lens can be kept better in balance during use.

The lower limit to condition (6) should be brought up to preferably 0.01, and more preferably 0.05.

The upper limit should be reduced down to preferably 0.09, and more preferably 0.08.

More preferably, upon zooming from the wide-angle end to the telephoto end, the third lens group should move in unison, and be positioned on the object side.

Moving the first lens group in unison contributes more to making the lens barrel simpler, lighter and smaller than containing a variable spacing in the third lens group. This also renders it easier to make sure assembly precision and optical performances.

Further, it is more preferable to satisfy the following condition (7).

$$1.5 \times m_2 < m_3 < 0.6 \times m_1 \tag{7}$$

Here $m_2$ is a difference in the position of the second lens group between at the wide-angle end and at the telephoto end provided that a plus sign is indicative of movement of the second lens group toward the object side, and $m_3$ is a difference in the position of the third lens group between at the wide-angle end and at the telephoto end provided that a plus sign is indicative of movement of the third lens group toward the object side.

Being not less than the lower limit of $1.5 \times m_2$ to condition (7) at the very least makes sure the amount of movement of the third lens group with respect to the amount of movement of the second lens group, and facilitates ensuring the desired zooming action.

Being not greater than the upper limit of $0.6 \times m_1$ to condition (7) at the very least helps moderately reduce the amount of movement of the third lens group with respect to the amount of movement of the first lens group, thereby ensuring the load of the second lens group on zooming by the movement of the first lens group while moderately reducing the amount of movement of the third lens group. This in turn prevents the structure of the lens barrel from getting complicated, and facilitates holding back changes in weight balance.

More preferably, the lower limit to condition (7) should be brought up to $2.0 \times m_2$.

More preferably, the second lens group should be made up of, in order from the object side, a negative meniscus lens convex on the object side, a cemented lens of a negative lens and a positive lens, and a negative lens.

As the lens portion of the second lens group nearer to the image side is made up of the cemented lens of a negative lens and a positive lens and the negative lens, it contributes to the main power of the second lens group, and facilitates correction of aberrations.

In addition, as the negative meniscus lens convex on the object side is located at a position in the second lens group and nearer to the object side, it permits the angle of incidence of light rays on the aforesaid cemented lens and negative lens to be so tweaked that the sensitivity of the second lens group to decentration is eased off.

Even when the first lens group is composed only of a positive lens and a negative lens, the location of the meniscus lens nearer to the first lens group works for correction of off-axis aberrations near the wide-angle end.

The first lens group, because of receiving light rays at some height, tends to increase in lens diameter, and is large in terms of the amount of movement upon zooming, too. Accordingly, the fact that the second lens group can be constructed as mentioned above and the first lens group can be composed of a fewer lenses is favorable for diminishing the whole size of the zoom lens.

Further, it is more preferable to satisfy the following condition (8).

$$0.3 < r_{2Gf}/d_{t1} < 2 \tag{8}$$

Here $r_{2Gf}$ is the paraxial radius of curvature of a surface located in, and nearest to the object side of, the second lens group, and $d_{t1}$ is an axial spacing between the first lens group and the second lens group at the telephoto end.

Condition (8) provides a definition of the object-side surface of the object-side lens in the second lens group, and a spacing between the first lens and the second lens group at the telephoto end.

Being not less than the lower limit of 0.3 to condition (8) at the very least contributes to moderately reducing the curvature of the object-side surface in the second lens group; the reduction of the amount of refraction of light rays at that surface at the telephoto end is preferable for correction of aberrations. Being not greater than the upper limit of 2 at the very least enables that surface to have a moderate curvature; it is preferable for correction of off-axis aberrations to moderately reduce the amount of refraction of off-axis light rays.

More preferably, the lower limit to condition (6) should be brought up to 0.3.

More preferably, the upper limit to condition (6) should be brought up to 1.

With both the lower and upper limits to condition (6) further limited as mentioned above, it is more preferable to satisfy the following condition (8-1).

$$0.5 < r_{2Gf}/d_{t1} < 1 \tag{8-1}$$

This is more effective for correction of aberrations.

It is also more preferable for the third lens group to comprise, in order from the object side, a front subgroup having positive refracting power and a rear subgroup having positive or negative refracting power, wherein the front subgroup is composed of two positive lenses and one negative lens, and satisfies the following conditions (9) and (10).

$$77 < v_{pmax} < 90 \tag{9}$$

$$63 < v_{pmix} < 80 \tag{10}$$

Here $v_{pmax}$ is the Abbe number of one of the two positive lenses in the front subgroup in the third lens group, and $v_{pmin}$ is the Abbe number of another positive lens in the front subgroup in the third lens group.

The front subgroup of the third lens group is located close to the aperture stop in such a way as to have positive refracting power contributing to image-formation capabilities. This is preferable for prevention of aberration fluctuations upon zooming. The power of the front subgroup here is liable to grow strong; it is preferable that the front subgroup is made up of two positive lenses and one negative lens from the purpose of facilitating correction of aberrations at it.

In the arrangement here, the two positive lenses located close to the aperture stop should preferably satisfy conditions (9) and (10) in view of correction of chromatic aberrations.

Referring here to a telephoto lens, it has a long focal length; chromatic aberrations appear to grow large even at the same rate of differences in the focal length due to wavelength. For this reason, it is preferable for the Abbe numbers of the two positive lenses to be not less than the lower limits of 77 and 63 to conditions (9) and (10), respectively, thereby keeping dispersion lower. Further, it is preferable for those Abbe numbers to be not greater than the upper limits of 90 and 80, respectively, thereby preventing anomalous dispersion from growing extraordinary and, hence, facilitating prevention of generation of secondary spectra.

Further, it is more preferable that the third lens group is made up of, in order from the object side, a front subgroup having positive refracting power and a rear subgroup having positive or negative refracting power, and satisfies the following conditions (11) and (12):

$$0.05 < d_{3w}/f_t < 0.2 \tag{11}$$

$$-0.7 < f_t/f_{3r} < 0.7 \tag{12}$$

Here $d_{3w}$ is an axial spacing between the front subgroup and the rear subgroup of the third lens group at the wide-angle end, and $f_{3r}$ is the focal length of the rear subgroup of the third lens group.

The front subgroup of the third lens group is positioned close to the aperture stop; if the front subgroup has refracting power and an image-formation action, it is then easy to keep aberrations against fluctuations upon zooming.

Here, it is preferable to satisfy conditions (11) and (12).

If the axial spacing between the front and the rear subgroup is maintained in such a way as to satisfy condition (11) with the rear subgroup having such weak power as to satisfy condition (12), it then works for keeping the whole length of the zoom lens short and improving the off-axis performance of the zoom lens. It is here noted that the invention also includes an arrangement wherein the axial spacing between the front and the rear subgroup is variable upon zooming from the wide-angle end to the telephoto end.

It is preferable to be not less than the lower limit of 0.05 to condition (11) at the very least, because of facilitating the separation of axial beams from off-axis beams at the rear subgroup and because of working for making sure the function of correcting off-axis performances.

Being not greater than the upper limit of 0.2 to condition (11) contributes more to keeping the whole length of the third lens group from growing long. This also facilitates bringing the powers of the respective lenses well in balance near the wide-angle end.

Thus, it is preferable for the third lens group to satisfy the range defined by the upper limit of 0.7 and the lower limit of −0.7 to condition (12), because the power by the rear subgroup is kept so small that the weight of lenses in the rear subgroup is reduced.

Further, it is preferable to satisfy the following condition (12A).

$$0.1 < |f/f_{3r}| \quad (12\text{-}A)$$

It is preferable to be not less than the lower limit of 0.1 to condition (12A), because of facilitating making sure the function of the rear subgroup of correcting aberrations.

Further, it is preferable to satisfy the following condition (12-1).

$$0 \le f/f_{3r} < 0.13 \quad (12\text{-}1)$$

It is preferable to be not less than the lower limit of 0 to condition (12-1) or it is preferable for the rear subgroup to have positive refracting power, because of facilitating positioning the exit pupil far away from the image plane.

It is preferable to be not greater than the upper limit of 0.13 to condition (12-1), because of contributing more to the weight reduction of the rear subgroup.

More preferably, the focusing operation from a distant object to a nearby object is carried out by the movement of the second lens group.

Thus, if the second lens group is designed as a focusing group, it is then possible to decreasing the diameter and amount of movement of the focusing group, and boost up space efficiency as well.

More preferably, the zoom lens of the invention is designed as a zoom lens having a total angle of view of 25° to 35° at the wide-angle end and a zoom ratio of 3 to 5.

According to the invention as described above, it is possible to tweak the mode of moving lens groups and the first lens group, thereby providing a zoom lens favorable for any one of improved optical performances, size reductions, high zoon ratios or the like.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is illustrative in section of Example 1 of the inventive zoom lens at the wide-angle end (a), in an intermediate state (b) and at the telephoto end (c), respectively.

FIG. 2 is illustrative, as in FIG. 1, of Example 2 of the inventive zoom lens.

FIG. 3 is illustrative, as in FIG. 1, of Example 2 of the inventive zoom lens.

FIG. 4 is illustrative, as in FIG. 1, of Example 2 of the inventive zoom lens.

FIG. 5 is illustrative, as in FIG. 1, of Example 2 of the inventive zoom lens.

DESCRIPTION OF THE PREFERRED EMBODIMENTS

Figure 6A:
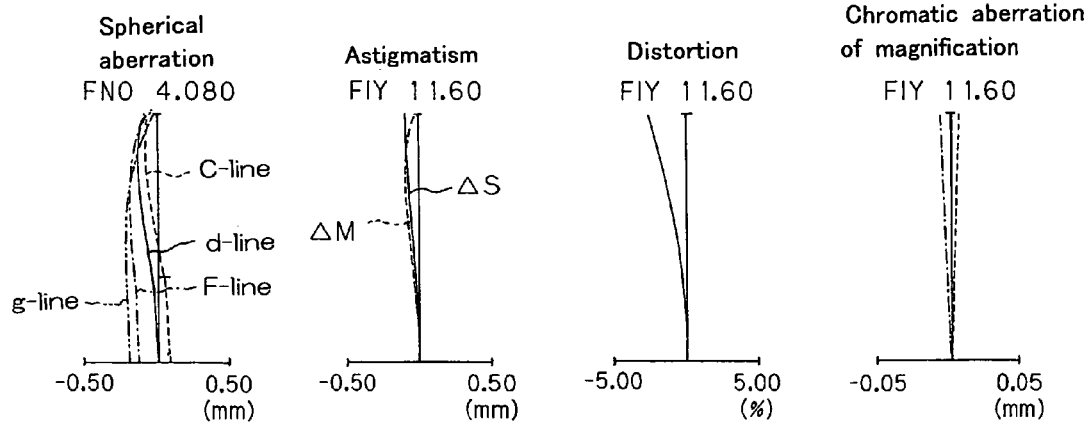
FIG. 6 is an aberration diagram for Example 1 upon focusing on an object point at infinity.
Figure 6B:
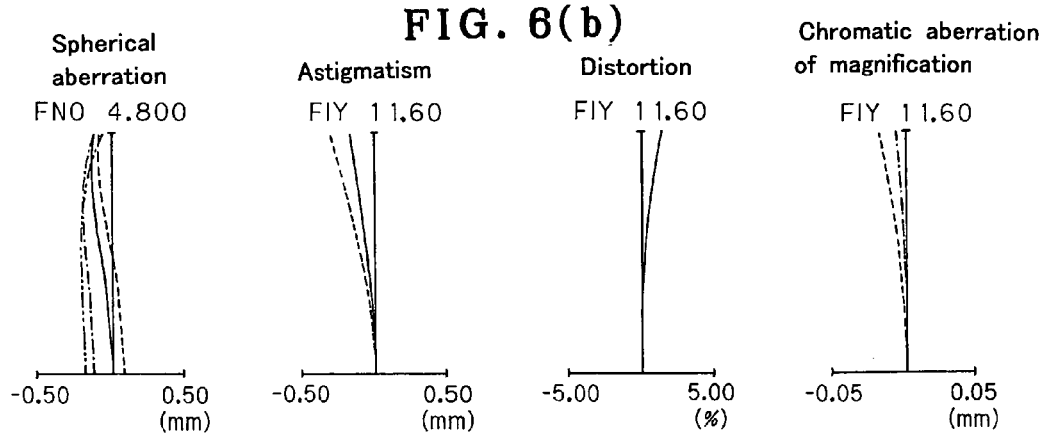
Figure 6C:
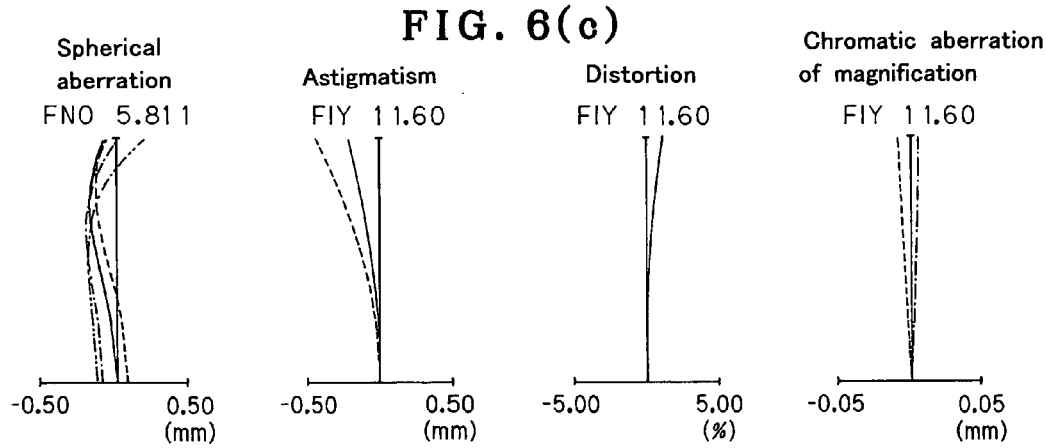
Figure 7A:
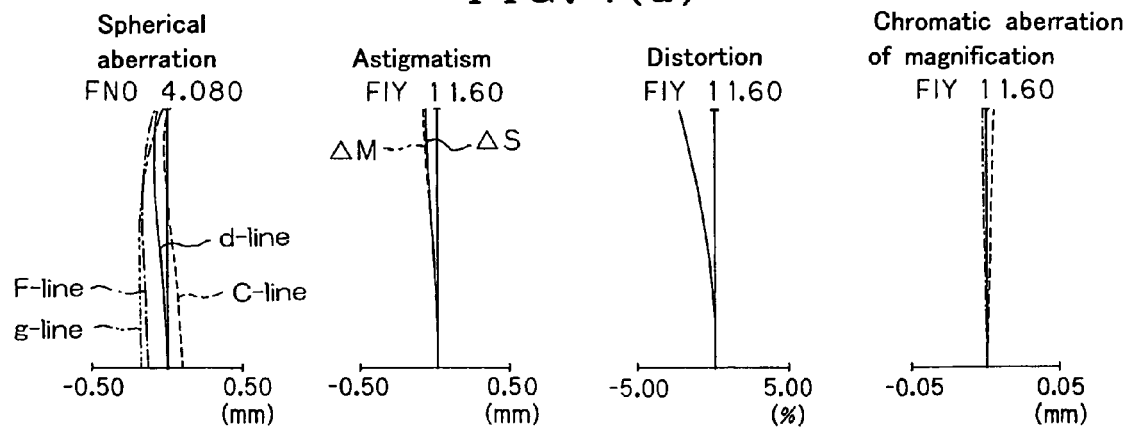
FIG. 7 is an aberration diagram for Example 2 upon focusing on an object point at infinity.
Figure 7B:
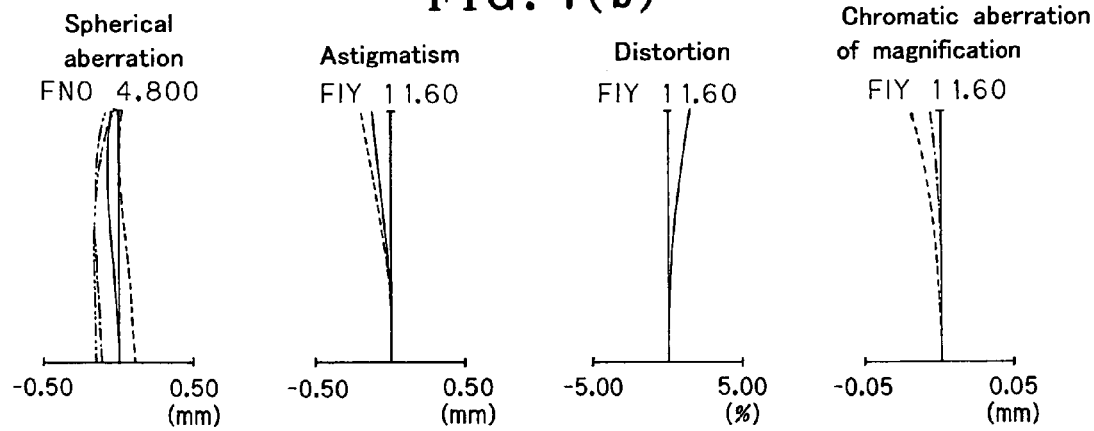
Figure 7C:
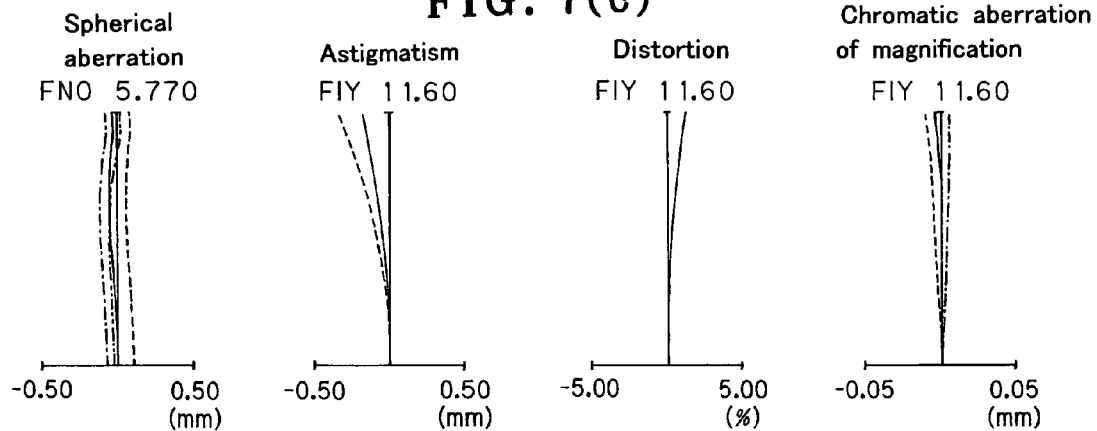
Figure 8A:
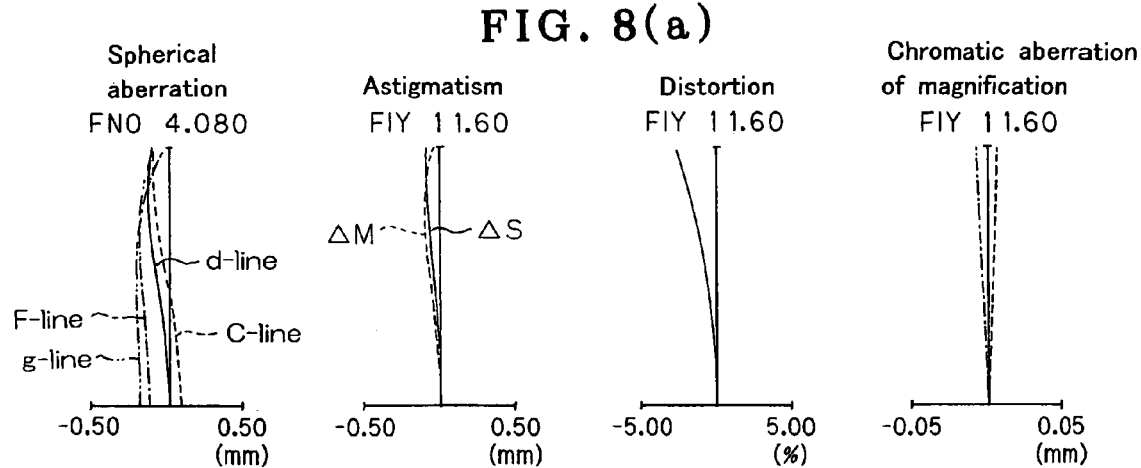
FIG. 8 is an aberration diagram for Example 3 upon focusing on an object point at infinity.
Figure 8C:
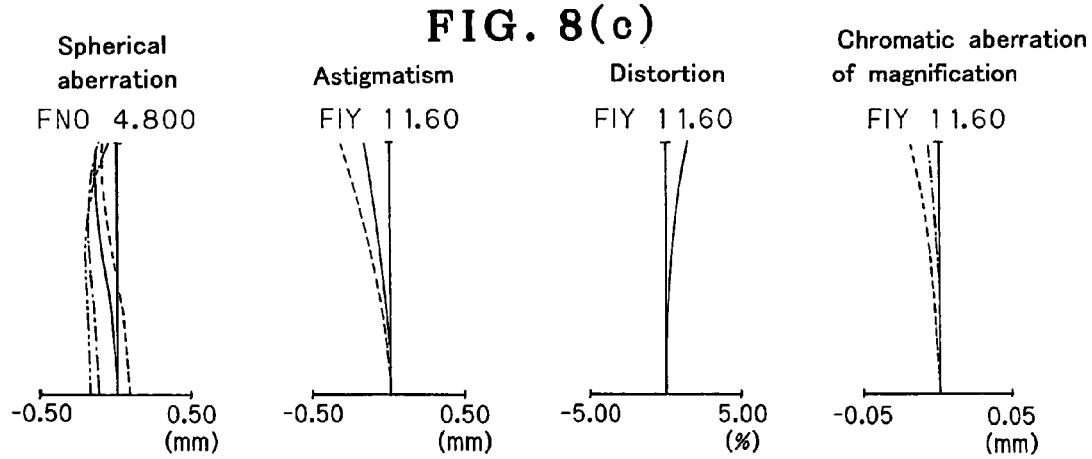
Figure 8B:
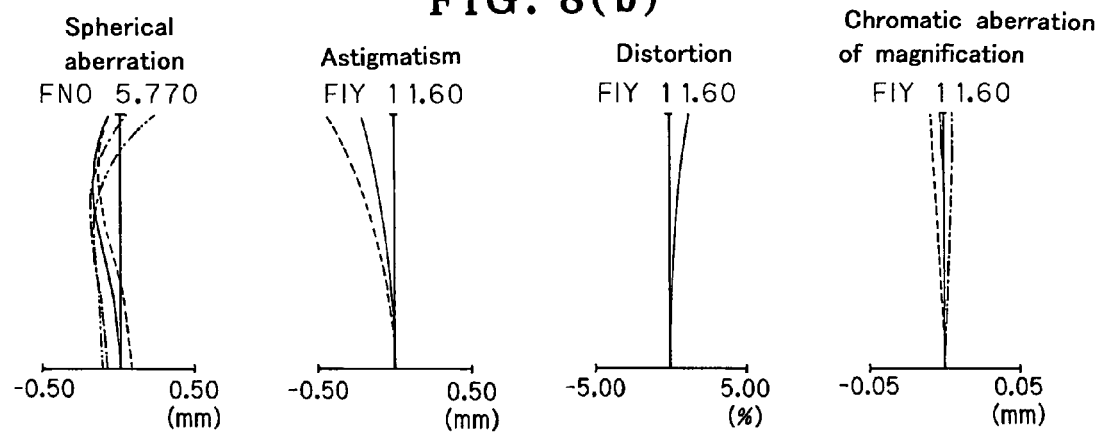
Figure 9A:
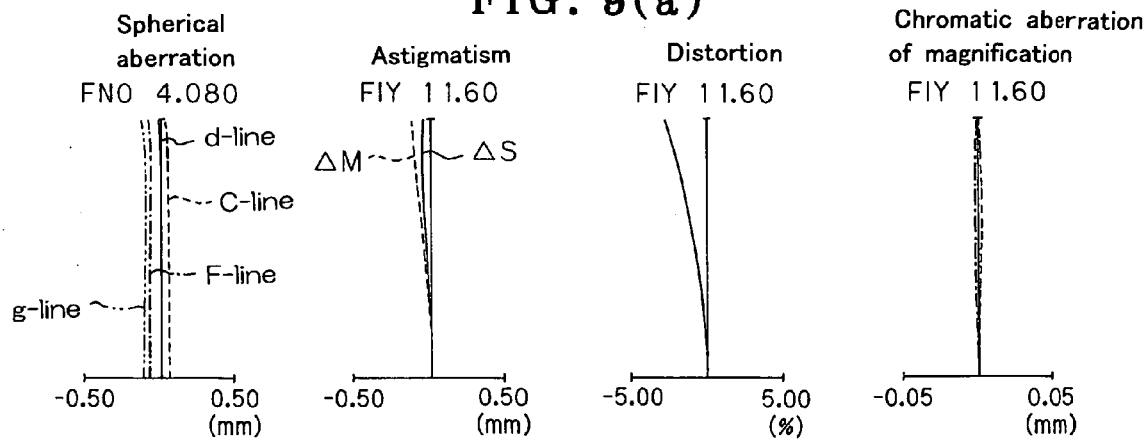
FIG. 9 is an aberration diagram for Example 4 upon focusing on an object point at infinity.
Figure 9B:
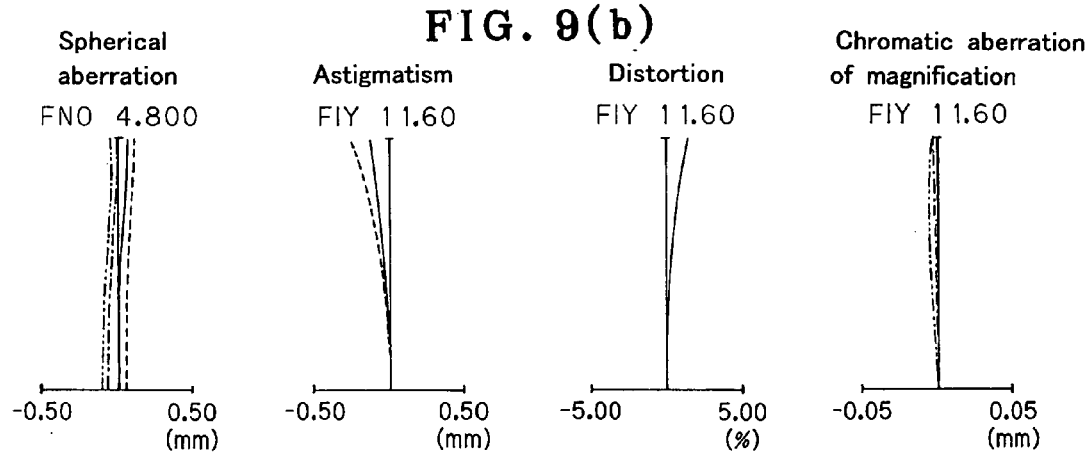
Figure 9C:
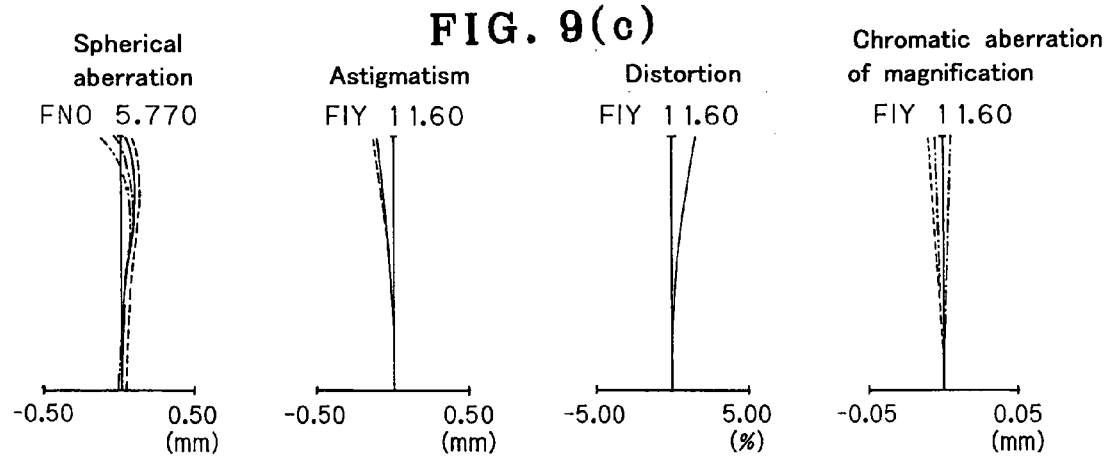
Figure 10A:
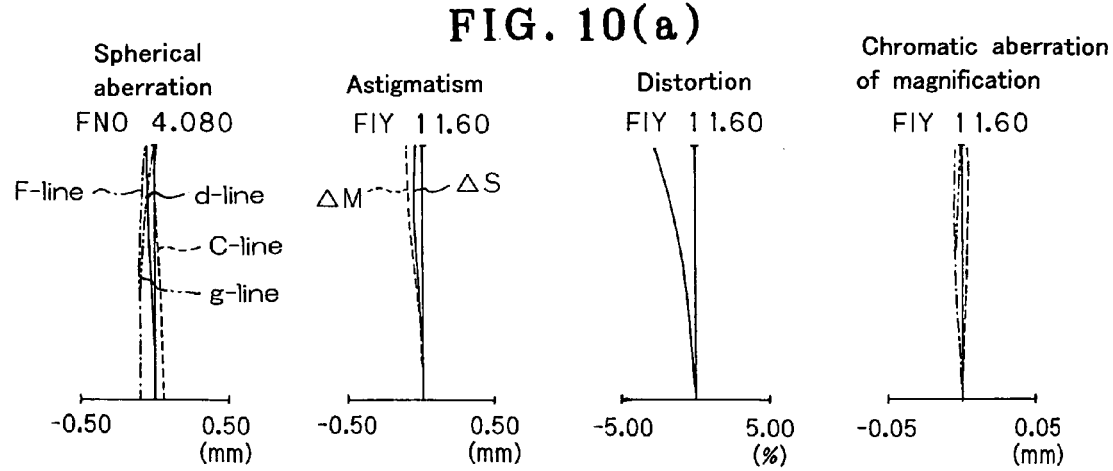
FIG. 10 is an aberration diagram for Example 5 upon focusing on an object point at infinity.
Figure 10B:
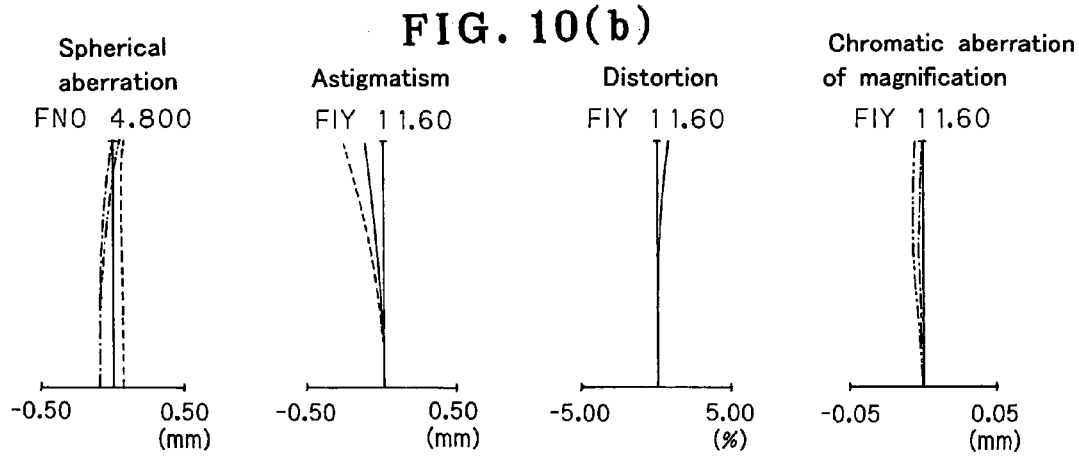
Figure 10C:
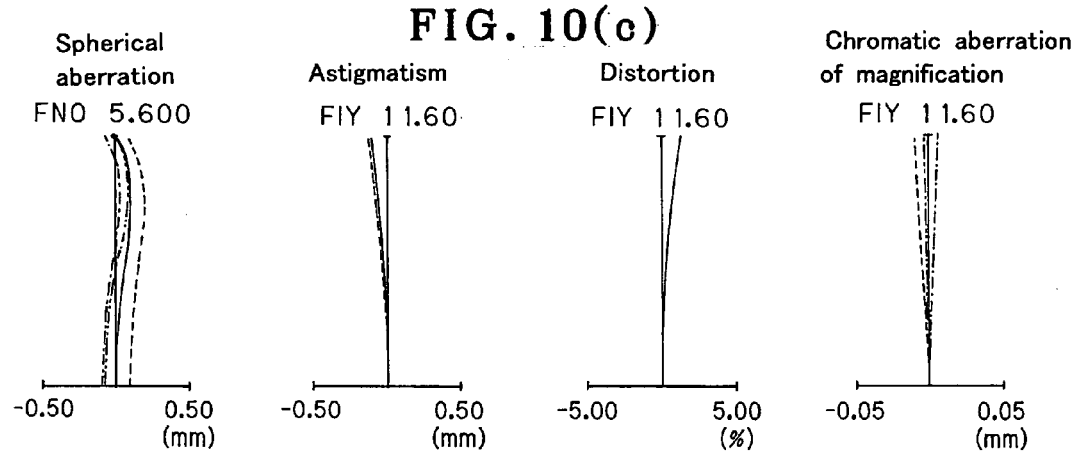
Figure 11A:
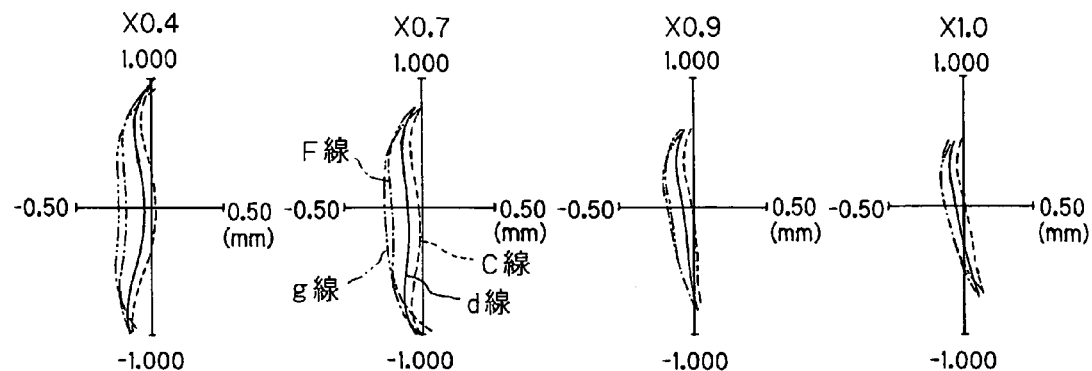
FIG. 11 is a transverse aberration diagram for Example 1 upon focusing on an object point at infinity.
Figure 11B:
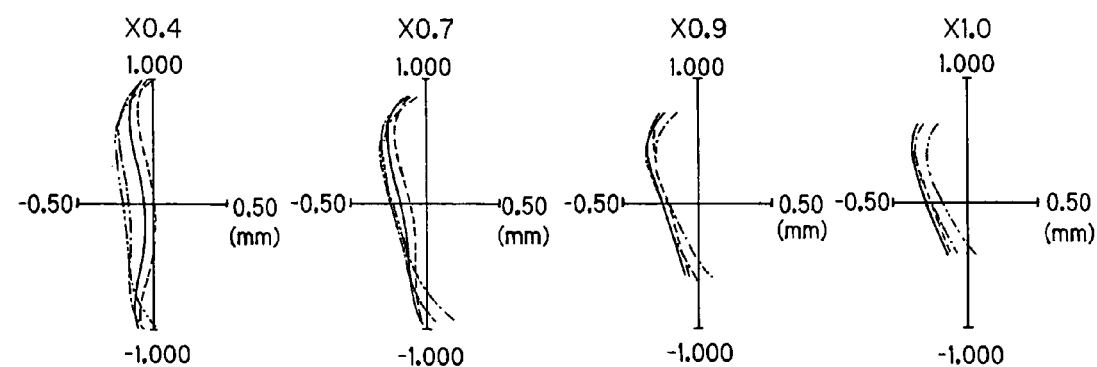
Figure 11C:
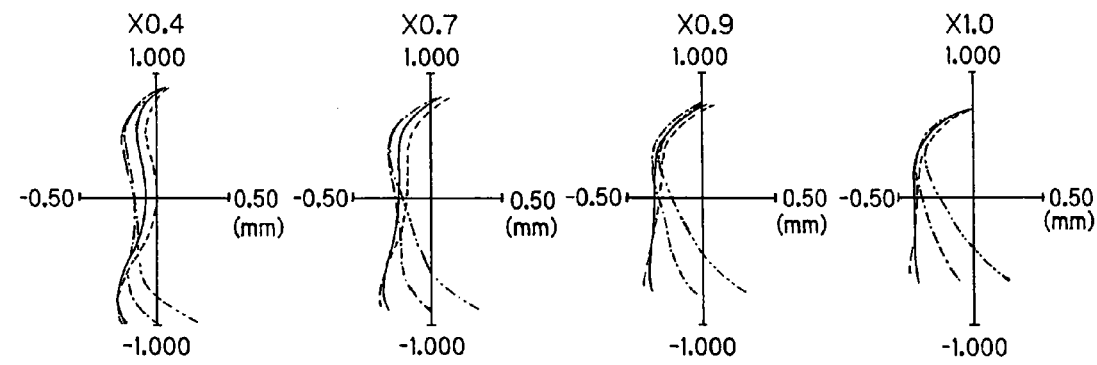
Figure 12A:
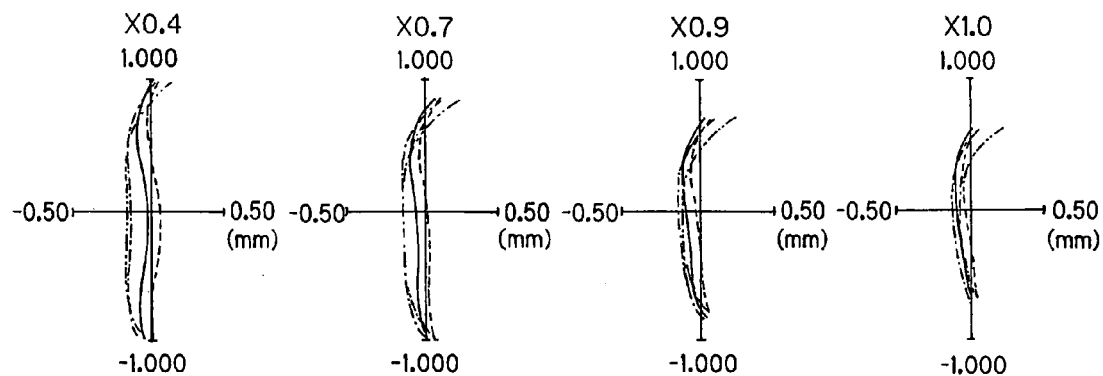
FIG. 12 is a transverse aberration diagram for Example 2 upon focusing on an object point at infinity.
Figure 12B:
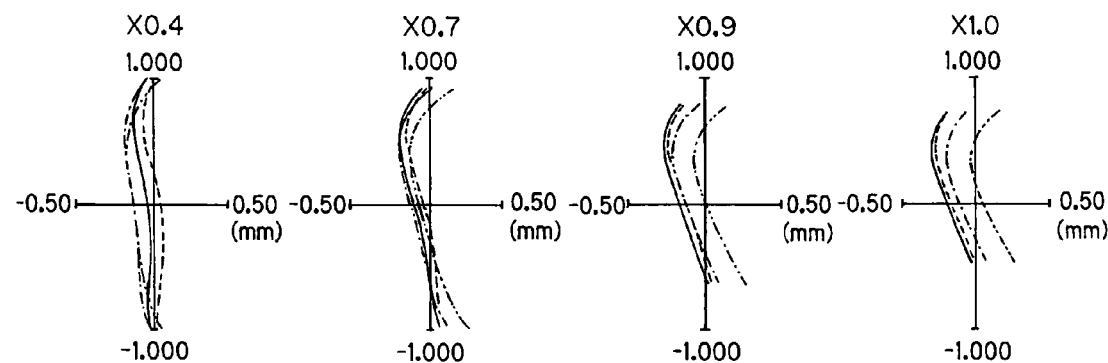
Figure 12C:
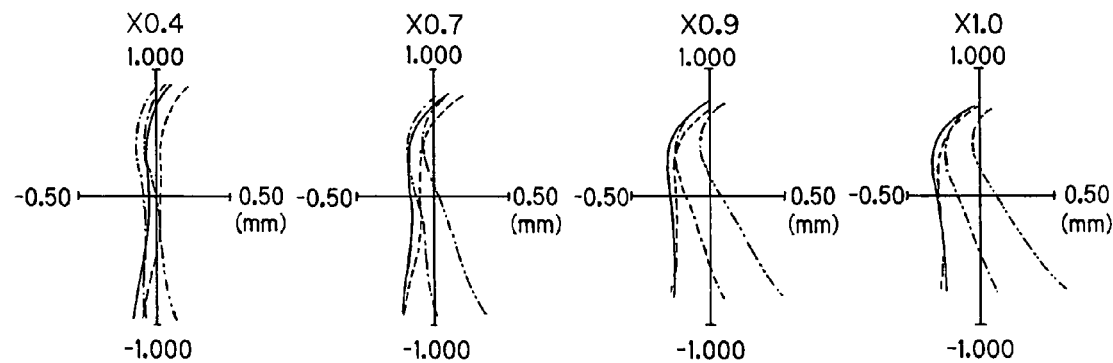
Figure 13A:
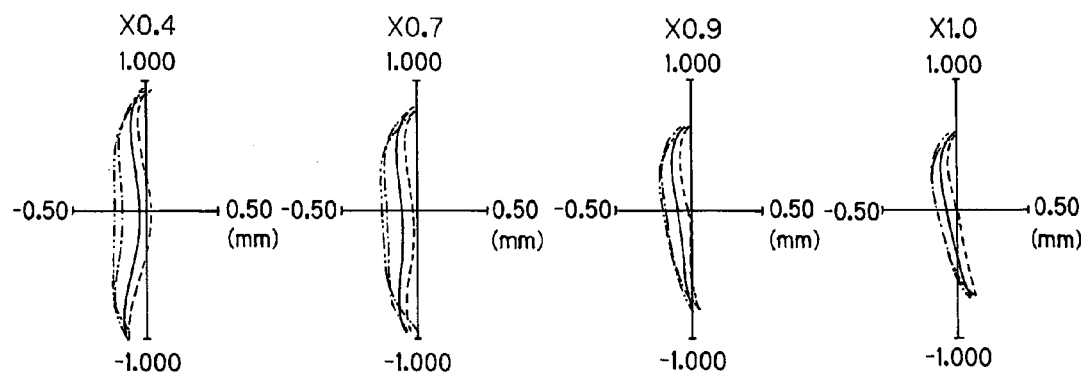
FIG. 13 is a transverse aberration diagram for Example 3 upon focusing on an object point at infinity.
Figure 13B:
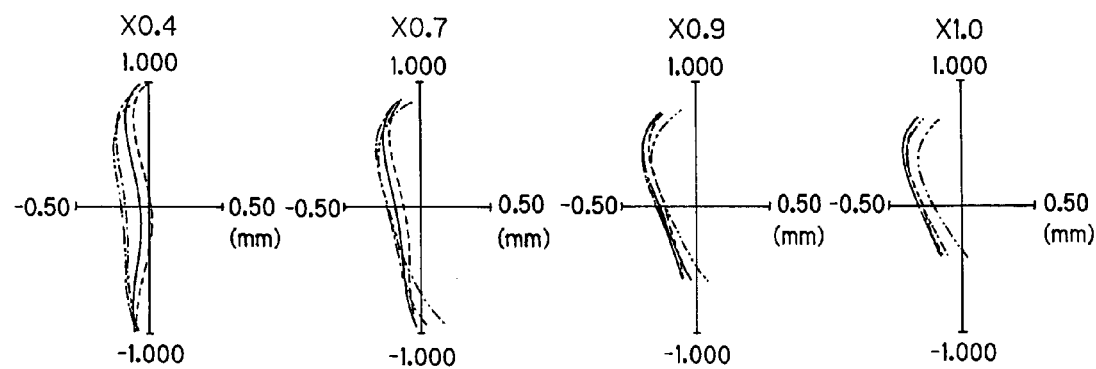
Figure 13C:
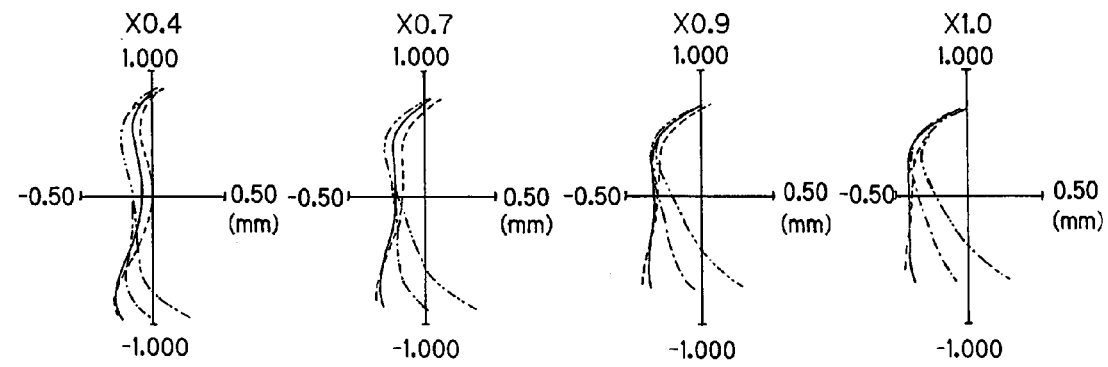
Figure 14A:
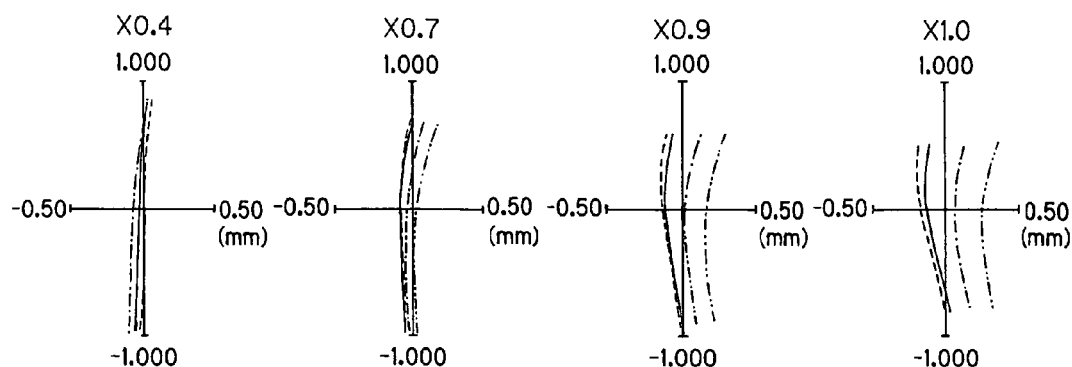
FIG. 14 is a transverse aberration diagram for Example 4 upon focusing on an object point at infinity.
Figure 14B:
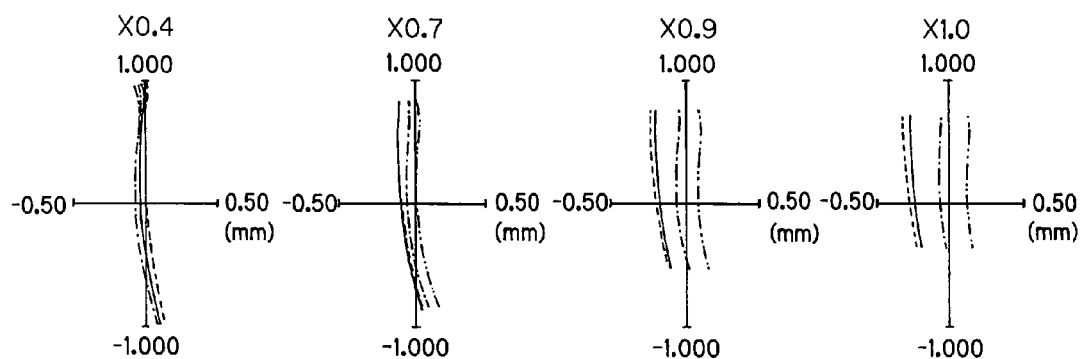
Figure 14C:
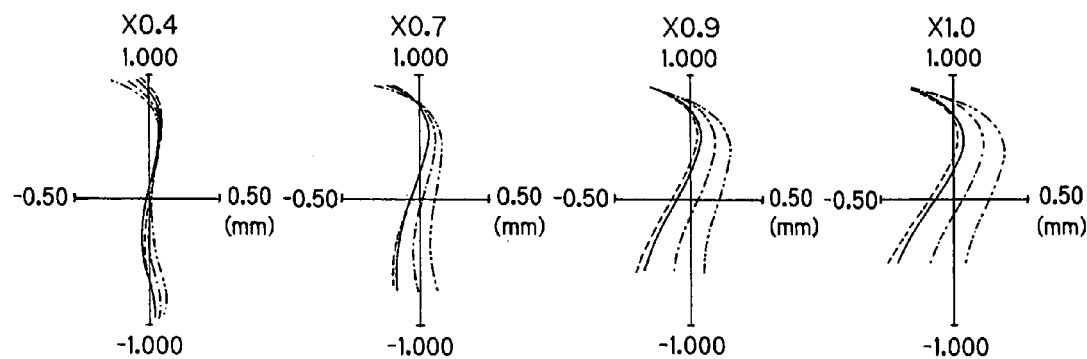
Figure 15A:
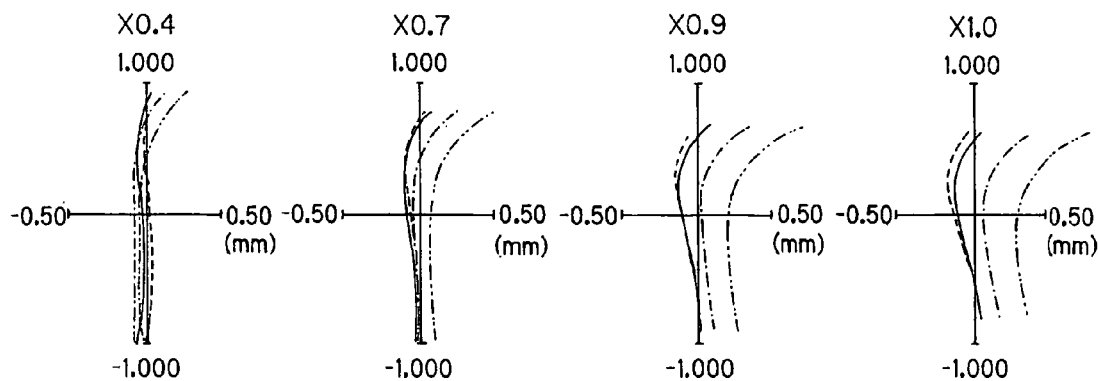
FIG. 15 is a transverse aberration diagram for Example 5 upon focusing on an object point at infinity.
Figure 15B:
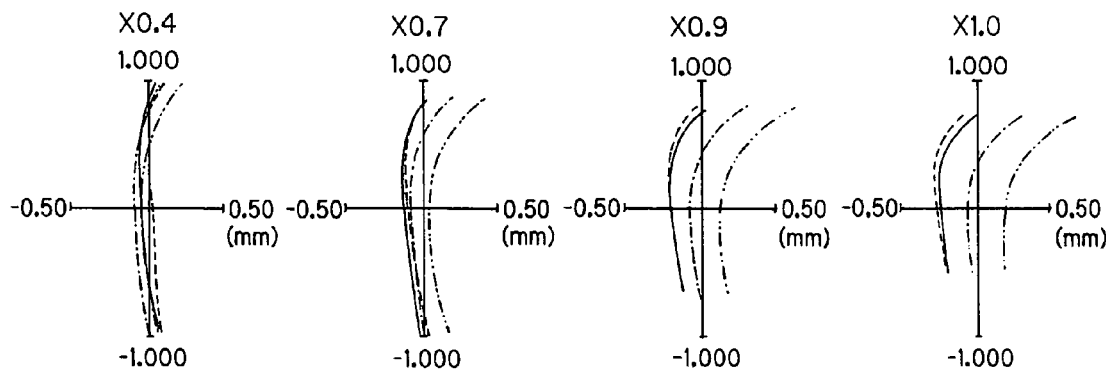
Figure 15C:
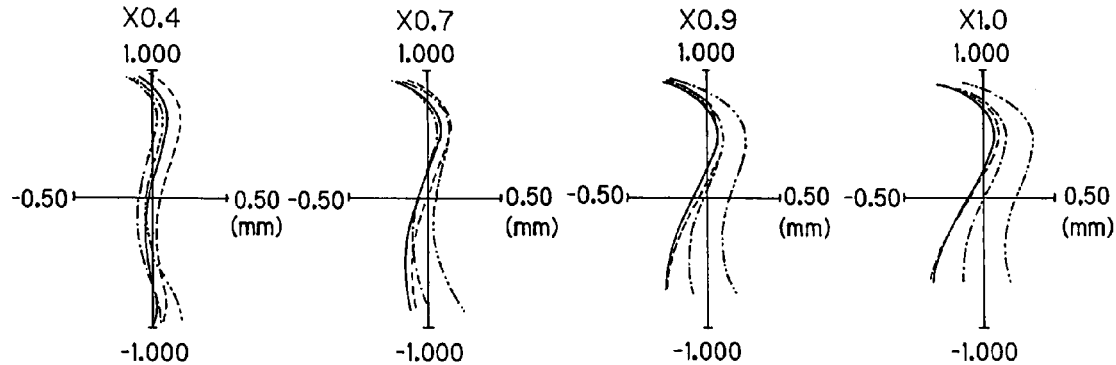

Examples 1, 2, 3, 4 and 5 of the inventive zoom lens are now explained. FIGS. 1, 2, 3, 4 and 5 are illustrative in section of Examples 1, 2, 3, 4 and 5 at wide-angle ends (a), in intermediate states (b) and at the telephoto ends (c), respectively, upon focusing on an object point at infinity. Throughout the drawings, G1 stands for a first lens group, G2 a second lens group, S an aperture stop, G3 a third lens group, F various filters (low-pass filter, infrared cut filter, dustproof vibration filter, CCD cover glass, etc.) in the form of one single plane-parallel plate, and I an image plane (light receiving plane of an electronic imaging device).

EXAMPLE 1

As shown in FIG. 1, Example 1 is directed to a zoom lens made up of, in order from its object side, the first lens group G1 of positive refracting power, the second lens group G2 of negative refracting power, the aperture stop S, and the third lens group G3 of positive refracting power. Upon zooming from the wide-angle end to the telephoto end of the zoom lens, the first lens group G1 moves in unison toward the object side, and the second lens group G2 moves in a concave locus toward the object side with an increasing space between the first G1 and the second lens group G2 and is positioned nearer to the object side at the telephoto end than at the wide-angle end. The aperture stop S and the third lens group G3 move in unison toward the object side with a decreasing spacing between the aperture stop S and the second lens group G2.

In order from the object side, the first lens group G1 is made up of a cemented lens consisting of a double-convex positive lens and a negative meniscus lens concave on the object side; the second lens group G2 is made up of a negative meniscus lens convex on the object side, a cemented lens consisting of a double-concave negative lens and a positive meniscus lens convex on the object side and a negative meniscus lens convex on the image side; and the third lens group G3 is made up of a front subgroup composed of a double-convex positive lens and a cemented lens consisting of a double-convex positive lens and a negative meniscus lens concave on the image side and a rear subgroup composed of a positive meniscus lens convex on the image side, a double-convex positive lens and a negative meniscus lens convex on the image side.

Focusing from a distant object to a nearby object is implemented by moving the second lens group G2 toward the object side.

EXAMPLE 2

As shown in FIG. 2, Example 2 is directed to a zoom lens made up of, in order from its object side, the first lens group G1 of positive refracting power, the second lens group G2 of negative refracting power, the aperture stop S, and the third lens group G3 of positive refracting power. Upon zooming from the wide-angle end to the telephoto end of the zoom lens, the first lens group G1 moves in unison toward the object side, and the second lens group G2 moves in a concave locus toward the object side with an increasing space between the first G1 and the second lens group G2 and is positioned nearer to the object side at the telephoto end than at the wide-angle end. The aperture stop S and the third lens group G3 move in unison toward the object side with a decreasing spacing between the aperture stop S and the second lens group G2.

In order from the object side, the first lens group G1 is made up of a cemented lens consisting of a double-convex positive lens and a negative meniscus lens concave on the object side; the second lens group G2 is made up of a negative meniscus lens convex on the object side, a cemented lens consisting of a double-concave negative lens and a positive meniscus lens convex on the object side and a negative meniscus lens convex on the image side; and the third lens group G3 is made up of a front subgroup composed of a double-convex positive lens and a cemented lens consisting of a double-convex positive lens and a negative meniscus lens concave on the image side and a rear subgroup composed of a positive meniscus lens convex on the image side, a double-convex positive lens and a negative meniscus lens convex on the image side.

EXAMPLE 3

As shown in FIG. 3, Example 3 is directed to a zoom lens made up of, in order from its object side, the first lens group G1 of positive refracting power, the second lens group G2 of negative refracting power, the aperture stop S, and the third lens group G3 of positive refracting power. Upon zooming from the wide-angle end to the telephoto end of the zoom lens, the first lens group G1 moves in unison toward the object side, and the second lens group G2 moves in a concave locus toward the object side with an increasing space between the first G1 and the second lens group G2 and is positioned nearer to the object side at the telephoto end than at the wide-angle end. The aperture stop S and the third lens group G3 move in unison toward the object side with a decreasing spacing between the aperture stop S and the second lens group G2.

In order from the object side, the first lens group G1 is made up of a cemented lens consisting of a double-convex positive lens and a negative meniscus lens concave on the object side; the second lens group G2 is made up of a negative meniscus lens convex on the object side, a cemented lens consisting of a double-concave negative lens and a positive meniscus lens convex on the object side and a negative meniscus lens convex on the image side; and the third lens group G3 is made up of a front subgroup composed of a double-convex positive lens and a cemented lens consisting of a double-convex positive lens and a negative meniscus lens concave on the image side and a rear subgroup composed of a positive meniscus lens convex on the image side, a double-convex positive lens and a negative meniscus lens convex on the image side.

EXAMPLE 4

As shown in FIG. 4, Example 4 is directed to a zoom lens made up of, in order from its object side, the first lens group G1 of positive refracting power, the second lens group G2 of negative refracting power, the aperture stop S, and the third lens group G3 of positive refracting power. Upon zooming from the wide-angle end to the telephoto end of the zoom lens, the first lens group G1 moves in unison toward the object side, and the second lens group G2 moves in a concave locus toward the object side with an increasing space between the first G1 and the second lens group G2 and is positioned a little nearer to the object side at the telephoto end than at the wide-angle end. The aperture stop S move toward the object side with a decreasing spacing between the aperture stop S and the second lens group G2. The third lens group G3 moves toward the object side with a decreasing spacing between the aperture stop S and the third lens group G3.

In order from the object side, the first lens group G1 is made up of a double-convex positive lens and a double-concave negative lens; the second lens group G2 is made up of a negative meniscus lens convex on the object side, a cemented lens consisting of a negative meniscus lens convex on the object side and a positive meniscus lens convex on the object side and a double-concave negative lens; and the third lens group G3 is made up of a front subgroup composed of a double-convex positive lens and a cemented lens consisting of a double-convex positive lens and a negative meniscus lens concave on the image side and a rear subgroup composed of a double-convex positive lens, a positive meniscus lens convex on the object side and a double-concave negative lens.

EXAMPLE 5

As shown in FIG. 5, Example 5 is directed to a zoom lens made up of, in order from its object side, the first lens group G1 of positive refracting power, the second lens group G2 of negative refracting power, the aperture stop S, and the third lens group G3 of positive refracting power. Upon zooming from the wide-angle end to the telephoto end of the zoom lens, the first lens group G1 moves in unison toward the object side, and the second lens group G2 moves in a concave locus toward the object side with an increasing spacing between the first G1 and the second lens group G2 and is positioned a little nearer to the object side at the telephoto end than at the wide-angle end. The aperture stop S moves toward the object side with a decreasing spacing between the aperture stop S and the second lens group G2. The third lens group G3 moves toward the object side with a decreasing spacing between the aperture stop S and the third lens group G3.

In order from the object side, the first lens group G1 is made up of a double-convex positive lens and a double-concave negative lens; the second lens group G2 is made up of a negative meniscus lens convex on the object side, a cemented lens consisting of a negative meniscus lens convex on the object side and a positive meniscus lens convex on the object side and a double-concave negative lens; and the third lens group G3 is made up of a front subgroup composed of a double-convex positive lens and a cemented lens consisting of a double-convex positive lens and a negative meniscus lens concave on the image side and a rear subgroup composed of double-convex positive lens, a positive meniscus lens convex on the object side and a double-concave negative lens.

Numerical data in each of Examples 1 to 5 are set out. The symbols used hereinafter but not hereinbefore have the following meanings:

f: the focal length of the whole zoom lens system,
F is an F-number,
$2\omega$ is an angle of view,
WE is the wide-angle end,
ST is an intermediate state,
TE is the telephoto end,
$r_1, r_2, \ldots$ are the radii of curvature of the respective lens surfaces,
$d_1, d_2, \ldots$ are a spacing between the adjacent lens surface,
$n_{d1}, n_{d2}, \ldots$ are the d-line refractive indices of the respective lenses,
$v_{d1}, v_{d2}, \ldots$ are the Abbe number of the respective lenses, and
OD is a subject distance as measured from the image

| | | | |
|---|---|---|---|
| $r_1 = 86.481$ | $d_1 = 4.99$ | $n_{d1} = 1.6031$ | $v_{d1} = 60.6$ |
| $r_2 = -108.395$ | $d_2 = 2.10$ | $n_{d2} = 1.8467$ | $v_{d2} = 23.8$ |
| $r_3 = -259.407$ | $d_3 = $ (Variable) | | |
| $r_4 = 35.302$ | $d_4 = 1.29$ | $n_{d3} = 1.8052$ | $v_{d3} = 25.4$ |
| $r_5 = 19.524$ | $d_5 = 4.38$ | | |
| $r_6 = -56.707$ | $d_6 = 1.01$ | $n_{d4} = 1.5168$ | $v_{d4} = 64.2$ |
| $r_7 = 20.158$ | $d_7 = 2.76$ | $n_{d5} = 1.8467$ | $v_{d5} = 23.8$ |
| $r_8 = 226.009$ | $d_8 = 1.27$ | | |
| $r_9 = -26.371$ | $d_9 = 1.00$ | $n_{d6} = 1.7725$ | $v_{d6} = 49.6$ |
| $r_{10} = -229.620$ | $d_{10} = $ (Variable) | | |
| $r_{11} = \infty$ (Stop) | $d_{11} = 1.20$ | | |
| $r_{12} = 69.845$ | $d_{12} = 3.44$ | $n_{d7} = 1.4875$ | $v_{d7} = 70.2$ |
| $r_{13} = -34.904$ | $d_{13} = 0.15$ | | |
| $r_{14} = 24.185$ | $d_{14} = 4.99$ | $n_{d8} = 1.4970$ | $v_{d8} = 81.5$ |
| $r_{15} = -24.185$ | $d_{15} = 1.18$ | $n_{d9} = 1.8010$ | $v_{d9} = 35.0$ |
| $r_{16} = -482.892$ | $d_{16} = 13.90$ | | |
| $r_{17} = -41.202$ | $d_{17} = 2.01$ | $n_{d10} = 1.5750$ | $v_{d10} = 41.5$ |
| $r_{18} = -22.237$ | $d_{18} = 0.30$ | | |
| $r_{19} = 97.144$ | $d_{19} = 1.84$ | $n_{d11} = 1.5168$ | $v_{d11} = 64.2$ |
| $r_{20} = -97.144$ | $d_{20} = 6.83$ | | |
| $r_{21} = -16.722$ | $d_{21} = 0.94$ | $n_{d12} = 1.7725$ | $v_{d12} = 49.6$ |
| $r_{22} = -40.266$ | $d_{22} = $ (Variable) | | |
| $r_{23} = \infty$ | $d_{23} = 4.63$ | $n_{d13} = 1.5163$ | $v_{d13} = 64.1$ |
| $r_{24} = \infty$ | $d_{24} = 2.50$ | | |
| $r_{25} = \infty$ (Imaging plane) | | | |

| | WE | ST | TE |
|---|---|---|---|
| Zooming Data (OD = $\infty$) | | | |
| f (mm) | 40.9 | 77.5 | 146.7 |
| $F_{NO}$ | 4.1 | 4.8 | 5.8 |
| $2\omega$ (°) | 30.5 | 16.4 | 8.7 |
| $d_3$ | 2.31 | 37.66 | 48.35 |

| | -continued | | |
|---|---|---|---|
| $d_{10}$ | 17.47 | 10.74 | 2.10 |
| $d_{22}$ | 28.43 | 33.81 | 54.53 |
| (OD = 900 mm) | | | |
| $d_3$ | 1.00 | 34.33 | 43.37 |
| $d_{10}$ | 18.77 | 14.07 | 7.07 |
| $d_{22}$ | 28.43 | 33.81 | 54.53 |

| | | | |
|---|---|---|---|
| $r_1 = 86.036$ | $d_1 = 5.28$ | $n_{d1} = 1.6031$ | $v_{d1} = 60.6$ |
| $r_2 = -102.465$ | $d_2 = 2.10$ | $n_{d2} = 1.8467$ | $v_{d2} = 23.8$ |
| $r_3 = -248.790$ | $d_3 = $ (Variable) | | |
| $r_4 = 22.968$ | $d_4 = 1.09$ | $n_{d3} = 1.8467$ | $v_{d3} = 23.8$ |
| $r_5 = 16.162$ | $d_5 = 5.69$ | | |
| $r_6 = -53.640$ | $d_6 = 1.25$ | $n_{d4} = 1.4875$ | $v_{d4} = 70.2$ |
| $r_7 = 17.706$ | $d_7 = 2.55$ | $n_{d5} = 1.8467$ | $v_{d5} = 23.8$ |
| $r_8 = 71.411$ | $d_8 = 1.40$ | | |
| $r_9 = -29.601$ | $d_9 = 1.10$ | $n_{d6} = 1.7725$ | $v_{d6} = 49.6$ |
| $r_{10} = -1996.707$ | $d_{10} = $ (Variable) | | |
| $r_{11} = \infty$ (Stop) | $d_{11} = 1.20$ | | |
| $r_{12} = 56.884$ | $d_{12} = 3.40$ | $n_{d7} = 1.4970$ | $v_{d7} = 81.5$ |
| $r_{13} = -37.250$ | $d_{13} = 0.15$ | | |
| $r_{14} = 27.088$ | $d_{14} = 4.81$ | $n_{d8} = 1.4875$ | $v_{d8} = 70.2$ |
| $r_{15} = -22.581$ | $d_{15} = 1.17$ | $n_{d9} = 1.9037$ | $v_{d9} = 31.3$ |
| $r_{16} = -128.399$ | $d_{16} = 12.75$ | | |
| $r_{17} = -44.665$ | $d_{17} = 2.09$ | $n_{d10} = 1.5182$ | $v_{d10} = 58.9$ |
| $r_{18} = -23.113$ | $d_{18} = 0.20$ | | |
| $r_{19} = 485.119$ | $d_{19} = 1.79$ | $n_{d11} = 1.7618$ | $v_{d11} = 26.5$ |
| $r_{20} = -55.909$ | $d_{20} = 8.44$ | | |
| $r_{21} = -17.929$ | $d_{21} = 0.88$ | $n_{d12} = 1.9037$ | $v_{d12} = 31.3$ |
| $r_{22} = -42.416$ | $d_{22} = $ (Variable) | | |
| $r_{23} = \infty$ | $d_{23} = 4.63$ | $n_{d13} = 1.5163$ | $v_{d13} = 64.1$ |
| $r_{24} = \infty$ | $d_{24} = 2.38$ | | |
| $r_{25} = \infty$ (Imaging plane) | | | |

| | WE | ST | TE |
|---|---|---|---|
| Zooming Data (OD = $\infty$) | | | |
| f (mm) | 40.8 | 77.5 | 146.7 |
| $F_{NO}$ | 4.1 | 4.8 | 5.8 |
| $2\omega$ (°) | 30.6 | 16.4 | 8.7 |
| $d_3$ | 2.34 | 35.87 | 46.81 |
| $d_{10}$ | 17.36 | 10.50 | 2.10 |
| $d_{22}$ | 28.68 | 34.69 | 55.22 |

| | | | |
|---|---|---|---|
| $r_1 = 86.435$ | $d_1 = 4.99$ | $n_{d1} = 1.6031$ | $v_{d1} = 60.6$ |
| $r_2 = -108.218$ | $d_2 = 2.10$ | $n_{d2} = 1.8467$ | $v_{d2} = 23.8$ |
| $r_3 = -258.821$ | $d_3 = $ (Variable) | | |
| $r_4 = 35.358$ | $d_4 = 1.29$ | $n_{d3} = 1.8052$ | $v_{d3} = 25.4$ |
| $r_5 = 19.530$ | $d_5 = 4.36$ | | |
| $r_6 = -56.727$ | $d_6 = 1.01$ | $n_{d4} = 1.5168$ | $v_{d4} = 64.2$ |
| $r_7 = 20.161$ | $d_7 = 2.76$ | $n_{d5} = 1.8467$ | $v_{d5} = 23.8$ |
| $r_8 = 227.061$ | $d_8 = 1.27$ | | |
| $r_9 = -26.367$ | $d_9 = 1.00$ | $n_{d6} = 1.7725$ | $v_{d6} = 49.6$ |
| $r_{10} = -231.956$ | $d_{10} = $ (Variable) | | |
| $r_{11} = \infty$ (Stop) | $d_{11} = 1.20$ | | |
| $r_{12} = 69.809$ | $d_{12} = 3.46$ | $n_{d7} = 1.4875$ | $v_{d7} = 70.2$ |
| $r_{13} = -34.889$ | $d_{13} = 0.15$ | | |
| $r_{14} = 24.145$ | $d_{14} = 5.02$ | $n_{d8} = 1.4970$ | $v_{d8} = 81.5$ |
| $r_{15} = -24.145$ | $d_{15} = 1.18$ | $n_{d9} = 1.8010$ | $v_{d9} = 35.0$ |
| $r_{16} = -481.556$ | $d_{16} = 13.78$ | | |
| $r_{17} = -41.103$ | $d_{17} = 2.08$ | $n_{d10} = 1.5750$ | $v_{d10} = 41.5$ |
| $r_{18} = -22.222$ | $d_{18} = 0.30$ | | |
| $r_{19} = 97.372$ | $d_{19} = 1.83$ | $n_{d11} = 1.5168$ | $v_{d11} = 64.2$ |
| $r_{20} = -97.372$ | $d_{20} = 6.85$ | | |
| $r_{21} = -16.713$ | $d_{21} = 0.94$ | $n_{d12} = 1.7725$ | $v_{d12} = 49.6$ |
| $r_{22} = -40.204$ | $d_{22} = $ (Variable) | | |
| $r_{23} = \infty$ | $d_{23} = 4.63$ | $n_{d13} = 1.5163$ | $v_{d13} = 64.1$ |
| $r_{24} = \infty$ | $d_{24} = 2.42$ | | |
| $r_{25} = \infty$ (Imaging plane) | | | |

-continued

| Zooming Data (OD = ∞) | | | |
|---|---|---|---|
| | WE | ST | TE |
| f (mm) | 40.9 | 77.5 | 146.8 |
| $F_{NO}$ | 4.1 | 4.8 | 5.8 |
| 2ω (°) | 30.5 | 16.4 | 8.7 |
| $d_3$ | 2.30 | 37.54 | 48.16 |
| $d_{10}$ | 17.45 | 10.72 | 2.10 |
| $d_{22}$ | 28.60 | 34.03 | 54.94 |

| | | | |
|---|---|---|---|
| $r_1 = 72.974$ | $d_1 = 3.42$ | $n_{d1} = 1.6031$ | $v_{d1} = 60.6$ |
| $r_2 = -221.186$ | $d_2 = 0.45$ | | |
| $r_3 = -363.380$ | $d_3 = 1.80$ | $n_{d2} = 1.8052$ | $v_{d2} = 25.4$ |
| $r_4 = 314.708$ | $d_4 = $ (Variable) | | |
| $r_5 = 105.397$ | $d_5 = 1.41$ | $n_{d3} = 1.6712$ | $v_{d3} = 57.6$ |
| $r_6 = 26.011$ | $d_6 = 3.92$ | | |
| $r_7 = 30.744$ | $d_7 = 0.98$ | $n_{d4} = 1.5315$ | $v_{d4} = 66.2$ |
| $r_8 = 16.748$ | $d_8 = 2.82$ | $n_{d5} = 1.6869$ | $v_{d5} = 30.2$ |
| $r_9 = 54.583$ | $d_9 = 1.48$ | | |
| $r_{10} = -38.745$ | $d_{10} = 1.06$ | $n_{d6} = 1.7725$ | $v_{d6} = 49.6$ |
| $r_{11} = 136.360$ | $d_{11} = $ (Variable) | | |
| $r_{12} = \infty$ (Stop) | $d_{12} = $ (Variable) | | |
| $r_{13} = 84.870$ | $d_{13} = 2.33$ | $n_{d7} = 1.4875$ | $v_{d7} = 70.2$ |
| $r_{14} = -47.027$ | $d_{14} = 0.15$ | | |
| $r_{15} = 23.439$ | $d_{15} = 4.17$ | $n_{d8} = 1.4970$ | $v_{d8} = 81.5$ |
| $r_{16} = -30.846$ | $d_{16} = 1.14$ | $n_{d9} = 1.9167$ | $v_{d9} = 25.4$ |
| $r_{17} = -204.810$ | $d_{17} = 10.66$ | | |
| $r_{18} = 167.137$ | $d_{18} = 2.53$ | $n_{d10} = 1.8628$ | $v_{d10} = 21.9$ |
| $r_{19} = -37.473$ | $d_{19} = 0.28$ | | |
| $r_{20} = 26.074$ | $d_{20} = 2.40$ | $n_{d11} = 1.6988$ | $v_{d11} = 48.9$ |
| $r_{21} = 110.272$ | $d_{21} = 1.73$ | | |
| $r_{22} = -35.799$ | $d_{22} = 0.96$ | $n_{d12} = 1.9037$ | $v_{d12} = 31.3$ |
| $r_{23} = 23.352$ | $d_{23} = $ (Variable) | | |
| $r_{24} = \infty$ | $d_{24} = 4.63$ | $n_{d13} = 1.5163$ | $v_{d13} = 64.1$ |
| $r_{25} = \infty$ | $d_{25} = 2.42$ | | |
| $r_{26} = \infty$(Imaging plane) | | | |

| Zooming Data (OD = ∞) | | | |
|---|---|---|---|
| | WE | ST | TE |
| f (mm) | 40.8 | 77.5 | 147.9 |
| $F_{NO}$ | 4.1 | 4.8 | 5.8 |
| 2ω (°) | 30.4 | 16.4 | 8.6 |
| $d_4$ | 4.95 | 41.70 | 56.43 |
| $d_{11}$ | 12.97 | 4.86 | 1.61 |
| $d_{12}$ | 13.70 | 10.54 | 1.50 |
| $d_{23}$ | 29.92 | 36.76 | 54.29 |

| | | | |
|---|---|---|---|
| $r_1 = 61.767$ | $d_1 = 4.98$ | $n_{d1} = 4.6031$ | $v_{d1} = 60.6$ |
| $r_2 = -364.922$ | $d_2 = 0.43$ | | |
| $r_3 = -669.033$ | $d_3 = 1.80$ | $n_{d2} = 1.8052$ | $v_{d2} = 25.4$ |
| $r_4 = 218.268$ | $d_4 = $ (Variable) | | |
| $r_5 = 88.770$ | $d_5 = 1.40$ | $n_{d3} = 1.6968$ | $v_{d3} = 55.5$ |
| $r_6 = 21.437$ | $d_6 = 3.92$ | | |
| $r_7 = 28.845$ | $d_7 = 0.98$ | $n_{d4} = 1.5168$ | $v_{d4} = 64.2$ |
| $r_8 = 15.324$ | $d_8 = 3.12$ | $n_{d5} = 1.6889$ | $v_{d5} = 31.1$ |
| $r_9 = 54.554$ | $d_9 = 1.54$ | | |
| $r_{10} = -36.674$ | $d_{10} = 1.06$ | $n_{d6} = 1.7725$ | $v_{d6} = 49.6$ |
| $r_{11} = 173.739$ | $d_{11} = $ (Variable) | | |
| $r_{12} = \infty$ (Stop) | $d_{12} = $ (Variable) | | |
| $r_{13} = 67.230$ | $d_{13} = 2.34$ | $n_{d7} = 1.4875$ | $v_{d7} = 70.2$ |
| $r_{14} = -54.210$ | $d_{14} = 0.15$ | | |
| $r_{15} = 26.095$ | $d_{15} = 4.14$ | $n_{d8} = 1.4970$ | $v_{d8} = 81.5$ |
| $r_{16} = -31.627$ | $d_{16} = 1.14$ | $n_{d9} = 1.8467$ | $v_{d9} = 23.8$ |
| $r_{17} = -147.476$ | $d_{17} = 12.63$ | | |
| $r_{18} = 102.030$ | $d_{18} = 2.30$ | $n_{d10} = 1.8467$ | $v_{d10} = 23.8$ |
| $r_{19} = -42.159$ | $d_{19} = 0.25$ | | |
| $r_{20} = 28.758$ | $d_{20} = 2.08$ | $n_{d11} = 1.7015$ | $v_{d11} = 41.2$ |
| $r_{21} = 101.079$ | $d_{21} = 1.72$ | | |
| $r_{22} = -34.535$ | $d_{22} = 0.96$ | $n_{d12} = 1.9037$ | $v_{d12} = 31.3$ |
| $r_{23} = 27.307$ | $d_{23} = $ (Variable) | | |
| $r_{24} = \infty$ | $d_{24} = 4.63$ | $n_{d13} = 1.5163$ | $v_{d13} = 64.1$ |
| $r_{25} = \infty$ | $d_{25} = 2.42$ | | |
| $r_{26} = \infty$(Imaging plane) | | | |

| Zooming Data (OD = ∞) | | | |
|---|---|---|---|
| | WE | ST | TE |
| f (mm) | 40.8 | 77.5 | 147.9 |
| $F_{NO}$ | 4.1 | 4.8 | 5.6 |
| 2ω (°) | 30.4 | 16.4 | 8.6 |
| $d_4$ | 3.60 | 43.92 | 54.41 |
| $d_{11}$ | 13.10 | 4.12 | 1.48 |
| $d_{12}$ | 11.22 | 10.85 | 1.50 |
| $d_{23}$ | 29.60 | 34.19 | 53.33 |

FIGS. 6, 7, 8, 9, and 10 is an aberration diagram for Example 1, 2, 3, 4, and 5, respectively, upon focusing on an object point at infinity. In these aberration diagrams, (a), (b) and (c) are indicative of spherical aberration, astigmatism, distortion and chromatic aberration of magnification, respectively, at the wide-angle end, in the intermediate state, and at the telephoto end. FIGS. 11, 12, 13, 14, and 15 is a transverse aberration diagram for Example 1, 2, 3, 4, and 5 at the wide-angle end (a), in the intermediate state (b) and at the telephoto end (c), respectively, upon focusing on an object point at infinity. In FIGS. 11 to 15, ×0.4, ×0.7, ×0.9, and ×1.0 are indicative of the magnification of an image height with respect to the maximum image height, showing transverse aberrations at that image height.

Tabulated below are the values of conditions (1) to (12) in Examples 1 to 5.

| Conditions | | Example 1 | Example 2 | Example 3 | Example 4 | Example 5 |
|---|---|---|---|---|---|---|
| (1) | $f_1/f_t$ | 0.857 | 0.853 | 0.856 | 1.073 | 1.011 |
| (2) | $m_1/f_t$ | 0.387 | 0.380 | 0.380 | 0.360 | 0.360 |
| (3), (5) | $\Delta n_1$ | 0.244 | 0.244 | 0.244 | 0.202 | 0.202 |
| (4) | $\Delta v_1$ | 36.8 | 36.8 | 36.8 | 35.2 | 35.2 |
| (6) | $m_2/f_t$ | 0.073 | 0.077 | 0.075 | 0.005 | 0.016 |
| (7) | $m_3$ | 26.1 | 26.6 | 26.3 | 24.4 | 23.7 |
| | $1.5 \times m_2$ | 16.1 | 17.1 | 16.5 | 1.2 | 3.6 |
| | $0.6 \times m_1$ | 34.1 | 33.5 | 34.1 | 32.0 | 31.9 |
| (8) | $r_{2Gf}/d_{t1}$ | 0.730 | 0.491 | 0.734 | 1.868 | 1.632 |
| (9) | $v_{pmax}$ | 81.500 | 81.500 | 81.500 | 81.500 | 81.500 |
| (10) | $v_{pmin}$ | 70.200 | 70.200 | 70.200 | 70.200 | 70.200 |
| (11) | $d_{3w}/f_t$ | 0.095 | 0.087 | 0.094 | 0.072 | 0.085 |
| (12) | $f_t/f_{3r}$ | 0.093 | 0.573 | 0.090 | -0.514 | -0.532 |

The aforesaid examples are each suitable for a zoom lens for single-lens reflex cameras that are used at a half angle of view of about 15° at the wide-angle end and on a relatively telephoto side as expressed by a zoom ratio of about 3 to 4.

In particular, each zoom lens is best suited for use with a single-lens reflex camera incorporating an electronic imaging device, because the associated camera can be made compact for carrying it around with improved performances by making the most of the ability of that to be downsized.

Figure 16:
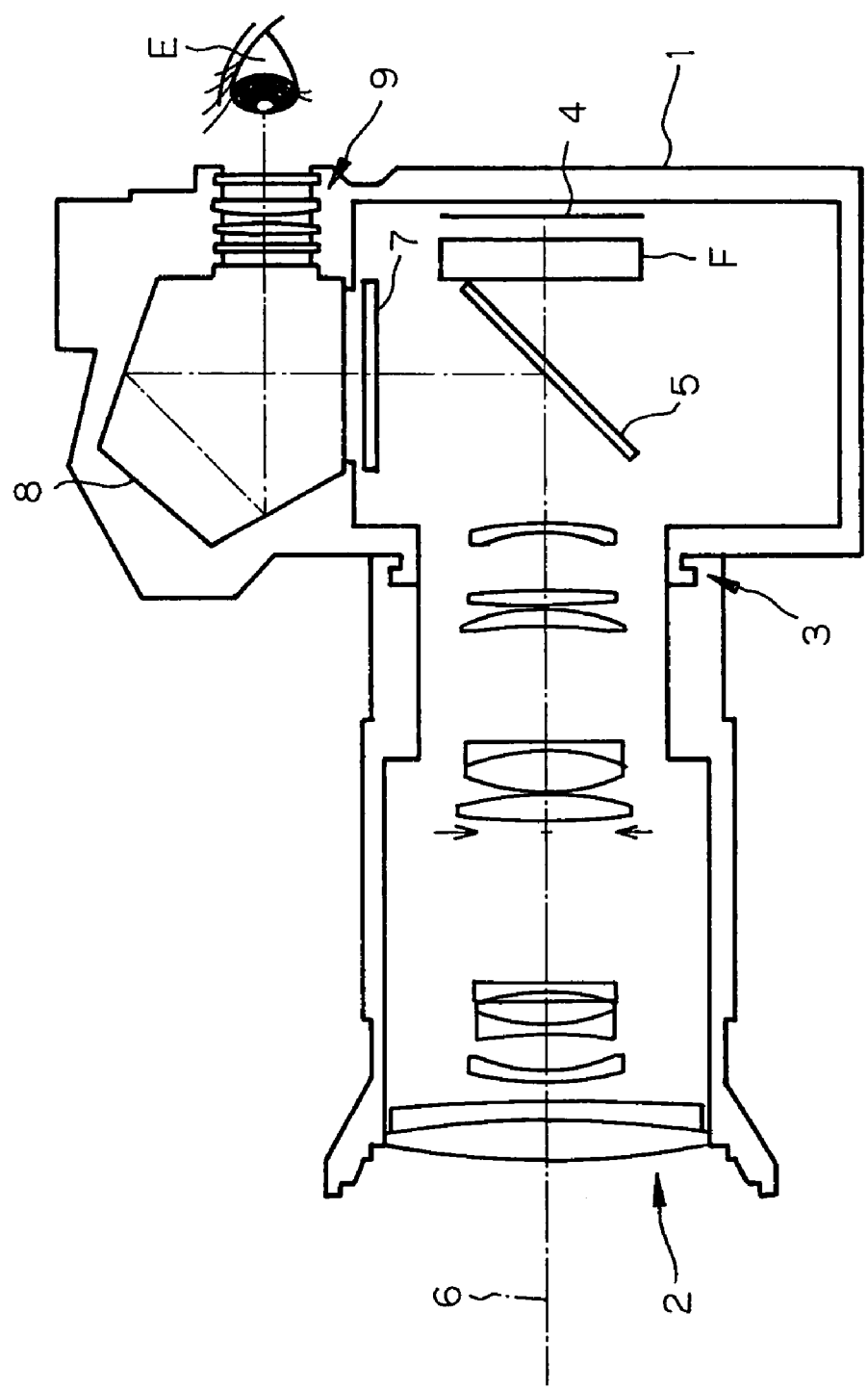
FIG. 16 is illustrative in section of a single-lens reflex camera with the inventive zoom lens used as an interchangeable lens.

FIG. 16 is illustrative in section of a single-lens reflex camera in the form of an electronic imaging apparatus that makes use of the inventive zoom lens and employs a small-format CCD or CMOS as an imaging device. In FIG. 16, reference numeral 1 is indicative of a single-lens reflex camera; 2 of a taking system built in a lens barrel comprising a zoom mechanism and a focusing mechanism; and 3 of a lens barrel mount that makes the taking lens system attachable to or detachable from the single-lens reflex camera 1, for which a screw type mount or a bayonet type mount may be used. In the embodiment here, the bayonet type mount is used.

Reference numeral 4 is indicative of the plane of the imaging device; 5 of a quick return mirror located between a lens system and the plane 4 of the imaging device on an optical path 6 of the taking lens system 2; 7 of a finder screen located on a optical path taken by light reflected off the quick return mirror 5; 8 of a penta prism; 9 of a finder; and E of a viewer's eye (eye point).

The inventive zoom lens exemplified by Example 1, 2, 3, 4, and 5 may be used as the taking lens system 2 in the single-lens reflex camera 1 having such structure as mentioned above.

According to the invention as described above, it is possible to achieve a zoom lens that lends itself to an interchangeable lens suitable for use with a single-lens reflex type digital camera, and that works for making sure the desired zoom ratio and optical performances while the total length of the zoom lens is kept short.

What we claim is:

1. A zoom lens comprising, in order from an object side thereof,
   a first lens group having positive refracting power,
   a second lens group having negative refracting power and
   a third lens group having positive refracting power, wherein:
   there is an aperture stop located between said second lens group and said third lens group;
   upon zooming from a wide-angle end to a telephoto end of the zoom lens,
   said first lens group moves in unison, and said second lens group moves in unison, and
   said first lens group and said second lens group are positioned nearer to the object side at said telephoto end than said wide-angle end with an increasing spacing between said first lens group and said second lens group and a decreasing spacing between said second lens group and said third lens group; and
   said zoom lens is a three lens group type zoom lens that satisfies the following conditions (1) and (2):

$$0.7 < f_1/f_t < 1.2 \tag{1}$$

$$0.3 < m_1/f_t < 0.45 \tag{2}$$

where $f_1$ is a focal length of the first lens group,
   $f_t$ is a focal length of the whole zoom lens system at the telephoto end, and
   $m_1$ is a difference in the position of the first lens group between at the wide-angle end and at the telephoto end, provided that a plus sign is indicative of movement of the first lens group toward the object side.

2. The zoom lens according to claim 1, which satisfies the following condition:

$$0.7 < f_1/f_t < 0.92 \tag{1-1}$$

3. The zoom lens according to claim 1, wherein a combined system at the wide-angle end of said first lens group and said second lens group has negative refracting power.

4. The zoom lens according to claim 1, wherein:
   said first lens group is made up of two lenses, a negative lens and a positive lens, wherein a surface of said positive lens on a negative lens side is configured as a convex surface and a surface of said negative lens on a positive lens side is configured as a concave surface, and satisfies the following conditions (3) and (4):

$$\Delta n_1 > 0.05 \tag{3}$$

$$\Delta v_1 > 20 \tag{4}$$

where $\Delta n_1$ is the value of a difference obtained by subtracting the refractive index of the positive lens from the refractive index of the negative lens in the first lens group, and $\Delta v_1$ is the value of a difference obtained by subtracting the Abbe number of the negative lens from the Abbe number of the positive lens in the first lens group.

5. The zoom lens according to claim 1, wherein:
   said first lens group comprises a cemented lens composed of a positive lens and negative lens in order from the object side, and satisfies the following condition (5):

$$0.05 < \Delta n_1 < 0.25 \tag{5}$$

where $\Delta n_1$ is the value of a difference obtained by subtracting the refractive index of the positive lens from the refractive index of the negative lens in the first lens group.

6. The zoom lens according to claim 1, which satisfies the following condition (6):

$$0 < m_2/f_t < 0.1 \tag{6}$$

where $m_2$ is a difference in the position of the second lens group between at the wide-angle end and at the telephoto end, provided that a plus sign is indicative of movement of the second lens group toward the object side.

7. The zoom lens according to claim 1, wherein:
   upon zooming from the wide-angle end to the telephoto end, said third lens group moves in unison, and is positioned nearer to the object side at said telephoto end than at said wide-angle end.

8. The zoom lens according to claim 7, which satisfies the following condition (7):

$$1.5 \times m_2 < m_3 < 0.6 \times m_1 \tag{7}$$

where $m_2$ is a difference in the position of the second lens group between at the wide-angle end and at the telephoto end, provided that a plus sign is indicative of movement of the second lens group toward the object side, and $m_3$ is a difference in the position of the third lens group between at the wide-angle end and at the telephoto end, provided that a plus sign is indicative of movement of the third lens group toward the object side.

9. The zoom lens according to claim 1, wherein:
   said second lens group comprises, in order from the object side, a negative meniscus lens convex on an object side thereof, a cemented lens composed of a negative lens and a positive lens, and a negative lens.

10. The zoom lens according to claim 9, which satisfies the following condition (8):

$$0.3 < r_{2Gf}/d_{t1} < 2 \tag{8}$$

where $r_{2Gf}$ is the paraxial radius of curvature of a surface located in, and nearest to the object side of, the second lens group, and $d_{t1}$ is an axial spacing between the first lens group and the second lens group at the telephoto end.

11. The zoom lens according to claim 10, which satisfies the following condition (8-1):

$$0.5 < r_{2Gf}/d_{t1} < 1 \tag{8-1}$$

12. The zoom lens according to claim 1, wherein:
    said third lens group comprises, in order from the object side, a front subgroup having positive refracting power and a rear subgroup having positive or negative refracting power, wherein:

said front subgroup comprises two positive lenses and one negative lens, and satisfies the following conditions (9) and 10):

$$77 < v_{pmax} < 90 \quad (9)$$

$$63 < v_{pmin} < 80 \quad (10)$$

where $v_{pmax}$ is the Abbe number of one of the two positive lenses in the front subgroup in the third lens group, and $v_{pmin}$ is the Abbe number of another positive lens in the front subgroup in the third lens group.

13. The zoom lens according to claim 1, wherein:
    said third lens group comprises, in order from the object side, a front subgroup having positive refracting power and a rear subgroup having positive or negative refracting power, and satisfies the following conditions (11) and (12):

$$0.05 < d_{3w}/f_t < 0.2 \quad (11)$$

$$-0.7 < f_t/f_{3r} < 0.7 \quad (12)$$

where $d_{3w}$ is an axial spacing between the front subgroup and the rear subgroup in the third lens group at the wide-angle end, and $f_{3r}$ is the focal length of the rear subgroup in the third lens group.

14. The zoom lens according to claim 13, which satisfies the following condition (12A):

$$0.1 < |f_t/f_{3r}| \quad (12\text{-A})$$

15. The zoom lens according to claim 13, which satisfies the following condition (12-1):

$$0 < f_t/f_{3r} < 0.13 \quad (12\text{-}1)$$

16. The zoom lens according to claim 1, wherein focusing operation from a distant object to a nearby object is implemented by movement of said second lens group.

17. The zoom lens according to claim 1, which has a total angle of view of 25° to 35° at the wide-angle end and a zoom ratio of 3 to 5.

* * * * *